United States Patent
Darnell et al.

(10) Patent No.: US 6,317,415 B1
(45) Date of Patent: Nov. 13, 2001

(54) METHOD AND SYSTEM FOR COMMUNICATING INFORMATION IN A NETWORK

(75) Inventors: B. Scott Darnell, Rockwall; William T. Jennings, Greenville; Bradley D. Lengel, Irving; Praveen S. Reddy, Austin, all of TX (US)

(73) Assignee: Raytheon Company, Lexington, MA (US)

( * ) Notice: Subject to any disclaimer, the term of this patent is extended or adjusted under 35 U.S.C. 154(b) by 0 days.

(21) Appl. No.: 09/162,317

(22) Filed: Sep. 28, 1998

(51) Int. Cl.⁷ .................................................. H04L 12/43
(52) U.S. Cl. .................... 370/230; 370/400; 370/460; 370/468
(58) Field of Search ................................ 370/258, 400, 370/401, 422, 449, 452, 455, 458, 460, 461, 462, 463, 468, 230–235, 406

(56) References Cited

U.S. PATENT DOCUMENTS

| | | | |
|---|---|---|---|
| 3,924,245 | 12/1975 | Eaton et al. | 340/172.5 |
| 4,482,999 | 11/1984 | Janson et al. | 370/86 |
| 4,835,770 | 5/1989 | Hayano | 370/94 |
| 5,257,259 | 10/1993 | Tsurumi | 370/60.1 |
| 5,301,185 | * 4/1994 | Cherry | 370/258 |
| 5,303,230 | 4/1994 | Hishida et al. | 370/58.1 |
| 5,305,314 | 4/1994 | Edblad et al. | 370/79 |
| 5,317,572 | 5/1994 | Satoh | 370/105.1 |
| 5,375,233 | 12/1994 | Kimber et al. | 395/600 |
| 5,428,819 | 6/1995 | Wang et al. | 455/34.1 |

(List continued on next page.)

FOREIGN PATENT DOCUMENTS

| | | | |
|---|---|---|---|
| 2 232 696 A | 11/1998 | (CA) | H04Q/3/00 |
| 0 256 681 | 7/1987 | (EP) | H04L/11/16 |
| 0 621 704 A1 | 4/1993 | (EP) | H04L/12/24 |
| 0 724 344 A2 | 7/1996 | (EP) | H04L/12/26 |
| 0 855 818 A2 | 1/1998 | (EP) | H04L/12/433 |
| 0 632 625 A1 | 1/1995 | (EP) | H04L/29/06 |

(List continued on next page.)

OTHER PUBLICATIONS

S. Cavalieri, et al, Abstract "Scheduling Transmissions in Time–Critical Distributed Systems," Universita' di Catania—Facolta' di Ingegneria Instituto di Informatica e Telecommunicazioni, IEEE, pp. 541–456, 1995.
PCT International Search Report dated Jan. 26, 2001 for PCT/US99/21722 filed Oct. 21, 1999.
Lin Y–S, et al., "Queue Management for Shared Buffer and Shared Multi–Buffer ATM Switches" Proceedings of Infocom, US, Los Alamitos, *IEEE Comp. Soc. Press.*, vol. Conf. 15 (pp 688–695), 1996.
"Protocol for Isochronous Traffic Over Fiber channel Switching" *IBM Technical Disclosure Bulletin*, US, IBM Corp. NY, vol. 37 No. 06B (pp 377–380), Jun. 1994.
Malavalli, "High Speed Fibre Channel Switching Fabric Services," *SPIE*, vol. 1577 (pp 216–226), 1991.
PCT International Search Report dated Jan. 26, 2000 for PCT/US99/21714 filed Sep. 21, 1999.

(List continued on next page.)

*Primary Examiner*—Ricky Ngo
(74) *Attorney, Agent, or Firm*—Baker Botts L.L.P.

(57) ABSTRACT

A communications system includes a plurality of network nodes including a first node having an interface unit. The interface unit includes a scheduler operable to schedule periodic transmission of a plurality of frames at respective designated times. Each of the plurality of frames includes a plurality of slots. The interface unit also includes an access system operable to designate which of the plurality of slots of a frame are accessible by each of the plurality of nodes and to access the designated slots.

26 Claims, 11 Drawing Sheets

U.S. PATENT DOCUMENTS

| | | | | |
|---|---|---|---|---|
| 5,502,719 | * | 3/1996 | Grant et al. | 370/422 |
| 5,519,690 | | 5/1996 | Suzuka et al. | 370/17 |
| 5,598,541 | | 1/1997 | Malladi | 395/286 |
| 5,602,852 | * | 2/1997 | Shiobara | 370/455 |
| 5,610,914 | | 3/1997 | Yamada | 370/395 |
| 5,610,921 | | 3/1997 | Christensen | 370/395 |
| 5,644,761 | | 7/1997 | Yoder et al. | 395/595 |
| 5,664,224 | | 9/1997 | Davis | 395/842 |
| 5,737,743 | | 4/1998 | Ooe et al. | 711/112 |
| 5,748,629 | | 5/1998 | Caldara et al. | 370/389 |
| 5,761,430 | | 6/1998 | Gross et al. | 395/200.55 |
| 5,768,043 | | 6/1998 | Nemazie et al. | 360/77.08 |
| 5,796,720 | | 8/1998 | Yoshida et al. | 370/245 |
| 5,828,402 | | 10/1998 | Collings | 384/5.5 |
| 5,835,087 | | 11/1998 | Herz et al. | 345/327 |
| 5,862,136 | | 1/1999 | Irwin | 655/402 |
| 5,924,112 | | 7/1999 | Barber et al. | 711/100 |
| 5,938,747 | | 8/1999 | Young | 710/53 |
| 5,963,982 | | 10/1999 | Goldman | 711/170 |
| 5,978,578 | | 11/1999 | Azarya et al. | 395/701 |
| 5,983,293 | | 11/1999 | Murakami | 710/56 |
| 5,991,847 | | 11/1999 | Ballard et al. | 711/3 |
| 5,999,634 | | 12/1999 | Abbott et al. | 382/103 |
| 6,041,060 | * | 3/2000 | Leichty et al. | 370/412 |
| 6,044,091 | * | 3/2000 | Kim | 370/508 |

FOREIGN PATENT DOCUMENTS

| | | | |
|---|---|---|---|
| 0 876 075 A2 | 11/1998 | (EP) | H04Q/11/00 |
| 06 326721 | 3/1995 | (JP) | H04L/12/42 |

OTHER PUBLICATIONS

PCT International Search Report dated Feb. 24, 2000 for PCT/US99/21722 filed Sep. 21, 1999.

PCT International Search Report dated Mar. 10, 2000 for PCT/US99/21648 filed Sep. 21, 1999.

PCT International Search Report dated Mar. 2, 2000 for PCT/US99/21721 filed Sep. 21, 1999.

* cited by examiner

FIG. 11 216

| MAIN MEMORY | | | | ADDR |
|---|---|---|---|---|
| WRITE TABLE FOR INTERFACE | | | | |
| FRAME TYPE | 31-22 | 21-10 | 9-0 | 0 |
| 0 | SLOTS USED (INTERFACE) | STARTING SLOT ADDRESS | OFFSET | |
| 1 | SLOTS USED (INTERFACE) | STARTING SLOT ADDRESS | OFFSET | 248 |
| 2 | SLOTS USED (INTERFACE) | STARTING SLOT ADDRESS | OFFSET | |
| 3-14 | ⋮ | ⋮ | ⋮ | |
| 15 | SLOTS USED (INTERFACE) | STARTING SLOT ADDRESS | OFFSET | 15 |
| WRITE TABLE FOR MICROPROCESSOR | | | | |
| FRAME TYPE | 31-22 | 21-10 | 9-0 | 16 |
| 0 | SLOTS USED (MICROPROCESSOR) | STARTING SLOT ADDRESS | OFFSET | 250 |
| 1 | SLOTS USED (MICROPROCESSOR) | STARTING SLOT ADDRESS | OFFSET | |
| 2 | SLOTS USED (MICROPROCESSOR) | STARTING SLOT ADDRESS | OFFSET | |
| 3-14 | SLOTS USED (MICROPROCESSOR) | STARTING SLOT ADDRESS | ⋮ | |
| 15 | SLOTS USED (MICROPROCESSOR) | STARTING SLOT ADDRESS | OFFSET | 31 |

| EXTRACTION TABLE | | | | | | | | | | |
|---|---|---|---|---|---|---|---|---|---|---|
| FRAME TYPE | 31-26 | 25 | 24 | 23 | 22 | 21 | 20 | 19-10 | 9-0 | 32 |
| 0 | UNUSED | WD MUL | C30 INS | GS IMS | INS | C30 A/D | G6 A/D | EXTRACTION MAP END ADDRESS | A_T OFFSET | |
| 1 | UNUSED | WD MUL | C30 INS | GS IMS | INS | C30 A/D | G6 A/D | EXTRACTION MAP END ADDRESS | A_T OFFSET | 252 |
| 2 | UNUSED | WD MUL | C30 INS | GS IMS | INS | C30 A/D | G6 A/D | EXTRACTION MAP END ADDRESS | A_T OFFSET | |
| 3-14 | ⋮ | ⋮ | ⋮ | ⋮ | ⋮ | ⋮ | ⋮ | ⋮ | ⋮ | |
| 15 | UNUSED | WD MUL | C30 INS | GS IMS | INS | C30 A/D | G6 A/D | EXTRACTION MAP END ADDRESS | A_T OFFSET | 47 |

| EXTRACTION ACCESS MAP | 254 |
|---|---|
| 31 30 29 28 27 26 25 24 23 22 21 20 19 18 17 16 15 14 13 12 11 10 9 8 7 6 5 4 3 2 1 0 | 48 49 50 51 52-638 639 |

METHOD AND SYSTEM FOR COMMUNICATING INFORMATION IN A NETWORK

CROSS-REFERENCE TO RELATED APPLICATIONS

This application is related to an application entitled Method and System for Communication with a Network having a Ser. No of 09/162,375 and an application entitled Method and System for Scheduling Network Communication having a Ser. No. of 09/162,370 and an application entitled Method and System for Managing Storage of Data having a Ser. No. of 09/162,372.

TECHNICAL FIELD OF THE INVENTION

This invention relates generally to information networks, and more particularly to a method and system for communicating information in a network.

BACKGROUND OF THE INVENTION

Communication devices such as telephones, computers, and video equipment may be interconnected to form a network. A network allows multiple parties to communicate with each other. Communications within a network often take the form of voice, data, video, or a combination of these forms. Such communications allow for meetings and presentations with participants separated by long distances. These events depend on the network to function as quickly and accurately as possible, in order to compensate for the distance of the participants.

A network may be formed by linking independent communication devices together according to a protocol. One example of a protocol for linking communication devices is Fibre Channel. In a Fibre Channel network, each device, acting as a node, or entry point onto the network, transmits and receives information through the network to the other network nodes. Although Fibre Channel networks may take various forms, a loop topology is often incorporated. In a loop topology, network nodes are connected in loop arrangement with any given node directly connected to only its two neighbors. In this manner, communication between all parties connected to the network is possible. One advantage of the some loop topologies is fault tolerance. In some implementations that utilize counter-rotational rings, if a break between nodes occurs, information may be routed back around the loop to its destination.

Information transmitted by the nodes travels around the loop until it reaches its destination. Traditionally, many Fibre Channel networks are configured to allow transmission of information by only one node at a given time. Thus, while any given node is transmitting information, all other nodes can only receive information. In addition traditional networking protocols do not specify the amount of time that this one node can transmit. Such communication schemes pose problems with the transmission of isochronous data that require the transfer of data at regular intervals such as live video and audio. A node that has live video to transfer is threatened with data loss if the network is currently servicing an unbounded transfer for another node. This problem is enhanced when the network has multiple sources of live isochronous data.

SUMMARY OF THE INVENTION

Accordingly, a need has arisen for an improved method and system for communicating information in a network. The present invention provides a method and system for communicating information in a network that addresses shortcomings of prior systems and methods.

According to one embodiment of the invention, a method for communicating information in a network having a plurality of nodes includes designating one of the plurality of nodes as a master node. The method also includes scheduling, by the master node, periodic transmission of a frame that has a plurality of slots. The method also includes receiving, at a first node of the plurality of nodes, the frame and determining which slots of the frame that are accessible to the first node. The method further includes accessing, by the first node, a slot that is determined to be accessible by the first node.

According to another embodiment of the invention, a communications system includes a plurality of network nodes including a first node comprising an interface unit. The interface unit includes a scheduler operable to schedule periodic transmission of a plurality of frames at respective designated times. Each of the plurality of frames includes a plurality of slots. The interface unit also includes an access system operable to designate which of the plurality of slots of a frame are accessible by the first node and to access the designated slots.

Embodiments of the invention provide numerous technical advantages. For example, in one embodiment of the invention, a plurality of users can transmit and receive information simultaneously rather than only one user being able to transmit at a time. Such communication allows synchronization of data from a plurality of sources, such as in videoconferencing. Furthermore, the network of the present invention allows transmission of information at both periodic rates and at aperiodic rates. Thus, user data that requires on-time delivery may be transmitted according to a periodic schedule and system data that does not require on-time delivery may be transmitted periodically when bandwidth is available. This sharing of bandwidth by both asynchronous and isochronous transmission types allows more cost-effective use of bandwidth. Furthermore, this sharing may be accomplished within a single network rather than requiring a plurality of different networks.

Other technical advantages are readily apparent to one skilled in the art from the following figures, descriptions, and claims.

BRIEF DESCRIPTION OF THE DRAWINGS

For a more complete understanding of the present invention and the advantages thereof, reference is now made to the following descriptions taken in connection with the accompanying drawings in which:

FIG. 11 is an illustration of an access map within the extraction/insertion unit of FIG. 8.

DETAILED DESCRIPTION OF THE INVENTION

Embodiments of the present invention and its advantages are best understood by referring to FIGS. 1 through 9 of the drawings, like numerals being used for like and corresponding parts of the various drawings.

Figure 1:
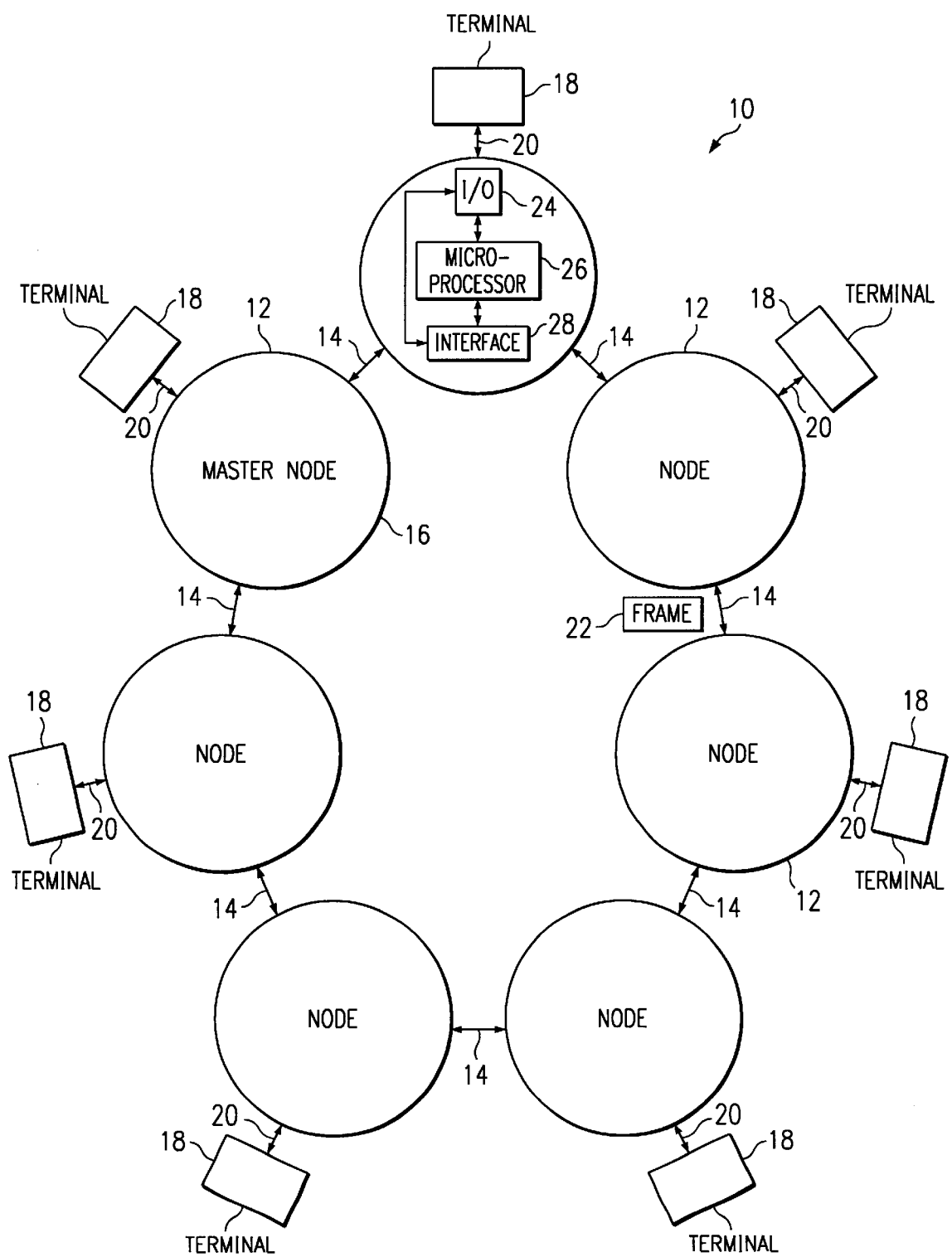
FIG. 1 is block a diagram of a telecommunications network constructed in accordance with the present invention.

FIG. 1 is a block diagram of a communications network 10 constructed according to the present invention. Communications network 10 facilitates communication by allowing parties using the network 10 to transmit and receive information, such as voice, data, and video. Such communication may occur simultaneously by a plurality of parties without transmission delay or jitter associated with prior networks. Network 10 comprises a plurality of nodes 12 serially connected in a loop topology according to, in the illustrated embodiment, standardized Fibre Channel constructs. Fibre Channel is an industry standard protocol for network communication. Although the invention is described in the context of a Fibre Channel transport layer, the teachings of the present invention can be used with other transport layers. Nodes 12 are connected to each other by a plurality of respective fibre links 14. The fibre links 14 are Standardized Fibre Channel links as defined by ANSI X3.230 that provide a conduit for bi-directional flow to and from respective nodes 12.

In communication network 10, one of the nodes 12 functions as a master node 16 and controls the overall bandwidth and timing allocated to each node 12, as described in greater detail below. The other nodes 12 in network 10 act as slave nodes. Although only one of the nodes 12 acts as master node 16 at a given time, according to one embodiment, any of the nodes 12 could act as master node 16. Master node 16 differs only in operation and may use the same physical implementation as other nodes.

Nodes 12 are interfaces between independent communication devices, such as terminals 18, and the communication network 10. Connected to each node 12, including master node 16, is a terminal 18. Each terminal 18 is an independent communications device such as a computer, fax machine, or telephone. In one embodiment, a terminal 18 that is connected to master node 16 acts as a master controller for network 10. Further, each terminal 18 is connected to a respective node 12 by a link 20. Each link 20 provides a conduit for information to flow between a connected terminal 18 and a respective node 12. In an alternative embodiment, each node 12 and its associated terminal 18 is contained in a single integrated device. Information traveling in network 10 is received and transmitted at each node 12. Each node 12 in turn transmits data to a connected terminal 18 and receives data from the connected terminal 18 to be transmitted on the network 10. Information is transmitted from node to node in network 10 in frames, such as a frame 22. Frame 22 is described in greater detail in conjunction with FIG. 2.

Each node 12 includes an input/output unit 24, a microprocessor 26, and a network interface unit 28; however, for clarity these components are illustrated in only one node 12 in FIG. 1. An input/output unit 24 receives information from an interconnected microprocessor 26 or network interface unit 28 and provides that information to terminal 18 over link 20. Additionally, input/output unit 24 receives information from a connected terminal 18 and provides that information to either network interface unit 28 or the interconnected microprocessor 26. Network interface unit 28 receives information from either input/output unit 24 or an interconnected microprocessor 26 and provides that information to the remainder of network 10 by inserting the information into frames 22. Additionally, network interface unit 28 extracts information from frames 22 transmitted in the network 10 and provides that information to either microprocessor 26 or input/output unit 24. Network interface unit 28, when within master node 16, also schedules transmission of frames 22 from the master node 16, as described in greater detail below in conjunction with FIGS. 5 and 6. Microprocessor 26 is used to support asynchronous data flow, the generation and processing of error messages, and the determination of which node 12 will serve as a master node 16. In this manner, input/output unit 24, microprocessor 26, and network interface unit 28 cooperate to translate and move information between communication network 10 and an interconnected terminal 18. The network interface unit 28 is described in greater detail below in conjunction with FIGS. 4 through 9.

In operation, frames 22 of a particular type, referred to as isochronous frames, and described in greater detail below are initiated at a periodic rate by master node 16 and are transmitted around the network 10 to each node 12 according to a schedule designated by the network interface unit 28 within master node 16. Isochronous frames 22 are initiated at master node 16, travel around network 10, and end at master node 16. Therefore, master node 16 is both the source and destination for isochronous frames 22. Since isochronous frames 22 are generated at a periodic rate, that means that isochronous frame 22 of a particular type may only leave master node 16 on integer multiples of that frame period. For example, if "T" represents the period of a frame transmission, then the sequence $\{0, T, 2T, \ldots, (n-1)T, nT, \ldots\}$, where n is some integer, represents the times at which this frame 22 are to be transmitted. If a frame arrives at master node 16 at some time t such that $(n-1)T<t<T$, then frame 22 must be stored in master node 16 for a time of $T-t$.

Once frame 22 stops for this re-synchronization interval, it may be re-transmitted with its contents intact. Fields of a frame header, which are described in greater detail below, are updated to reflect the properties of a new sequence of which frame 22 is a member. Sequences of frames 22 are described in greater detail below in conjunction with FIG. 3. Thus, the round trip transit time for a frame 22 at any node 12 is a integer multiple of the frame period, T.

Upon arrival at a given node 12, frames 22 travel through a network interface unit 28. While traveling through network interface unit 28, node 12 may read information from particular locations in a frame and may write information to particular locations in the frame. The locations in a frame 22 that a particular node 12 may read from or write to are designated by the type of frame 22 transmitted. This designation is described in greater detail below in conjunction with FIGS. 10 and 11. Information read from a frame 22 is then provided to a connected terminal 18, through input/output unit 24, over link 20, or alternatively, to microprocessor 26 through input/output unit 24. Information written into a frame 22 at a node 12 is processed as described below.

While accessing an isochronous frame 22, the frame is then retransmitted to the next node 12 according to a schedule designated by the master node 16. Because any node 12 can be allocated a portion of a frame 22 for writing data and a portion for reading data, rather than only one node 12 having sole read or write access to a given frame 22, all nodes 12 may transmit and receive information almost simultaneously. Furthermore, such operation allows deterministic transfer of data to be designated at the time data is delivered. Thus, the invention provides on-time delivery of information. Such operation stands in contrast to traditional loop based network communications where transmission of information by one node unpredictably or randomly halts transmission by any other node until the transmission is complete, preventing on-time delivery and synchronization of data from a plurality of originating sources.

One advantageous aspect of one implementation of the invention is that it is self healing. In one embodiment, each node 12 is configured into a dual loop implementation an utilities bi-directional Fibre Channel interconnect links 20 between nodes 12 to support counter-rotational data flow. This is implemented by providing internal loop-back capability at each port 68 and 70, illustrated in FIG. 4, in network interface 28 where the return path serves as the "redundant interface," to create counter-rotating rings. The primary ring normally carries all the data and the secondary ring normally carries link responses and other signals, but is capable of independent data transmission as well. The secondary ring's main function is to provide an alternate path in case of failure along the primary data path. If a failure occurs at a node n, then node n−1 would loop back to the secondary path, and node n+1 would take the data from the secondary path and loop it back to the primary. Intervening nodes would simply pass the data through in the reverse direction (Auxiliary Path), with data insertion or extraction only occurring on the forward pass through the node 12. Network 10 must be self healing, since the links are still connected, and on the main path attempts shall be made to re-establish the normal mode of operation even while a node 12 is in the loop back state. In the loop back configuration the intermediate nodes treat the data flowing in the counterclockwise sense as a pass through function since data is still extracted or inserted along the normal clockwise sense pathway through the node.

Additional details of network 10 are described below. The transmission of frames 22 is described in conjunction with FIGS. 2 and 3. Components of the network interface unit 28 are described generally in conjunction with FIG. 4. Scheduling transmission of frames by a network interface unit 28 is described in greater detail in conjunction with FIGS. 5 and 6. A main memory within a network interface unit 28 and the allocation of memory space to accommodate both asynchronous and isochronous transmissions is described in conjunction with FIG. 7. Insertion of data into and extraction of data from frames 22 is described in conjunction with FIGS. 10 and 11.

Figure 2:
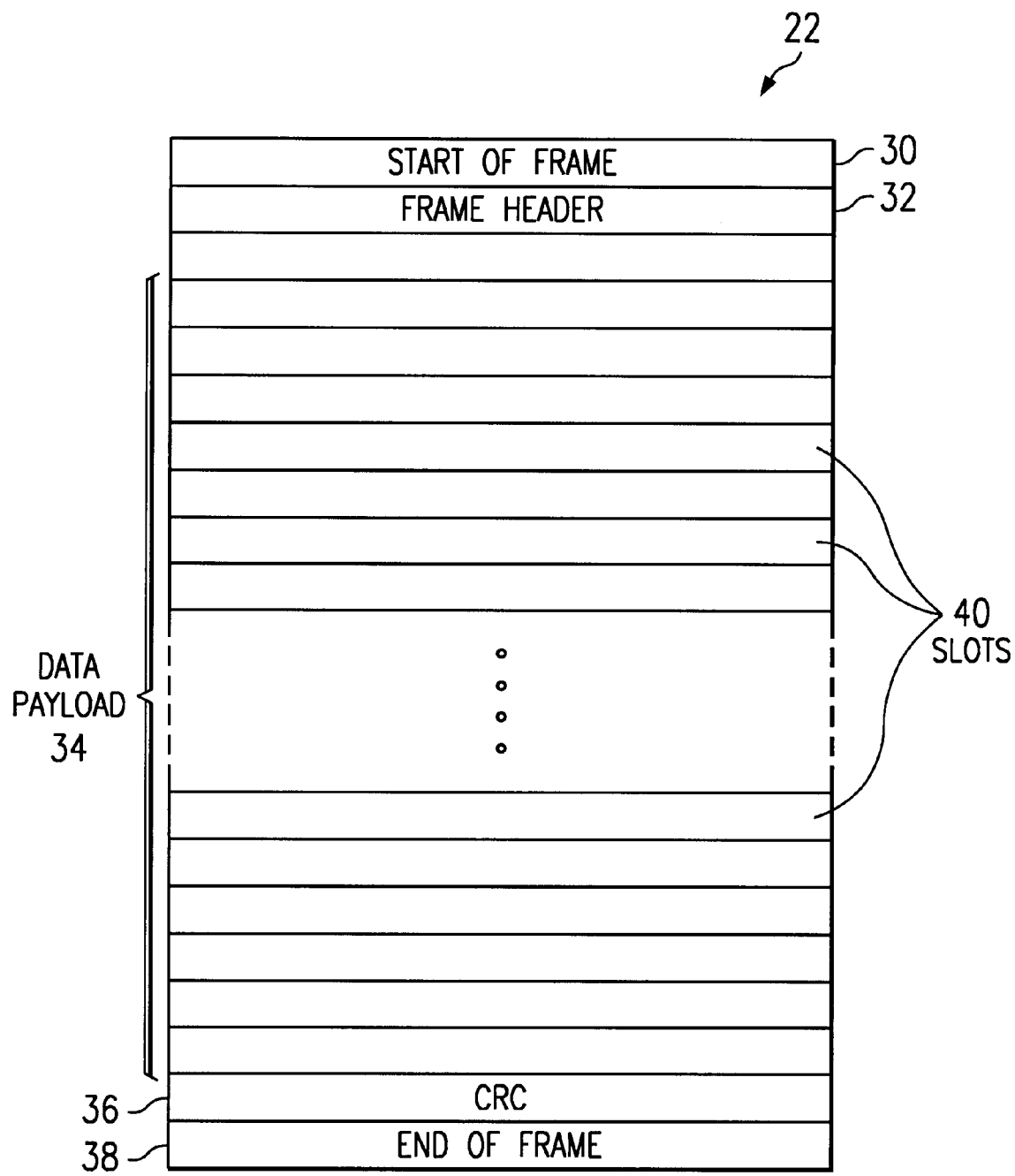
FIG. 2 is a representation of a frame for carrying information within the network of FIG. 1.

FIG. 2 is a representation of a frame 22 utilized in communications network 10 of the present invention. Frame 22 is defined according to Fibre Channel specifications, as defined in ANSI X3.320, and includes a start-of-frame (SOF) section 30, a frame header section 32, a data payload section 34, a cyclic redundancy check (CRC) section 36, and an end-of-frame (EOF) section 38. Start-of-frame section 30 is a delimiter that designates the beginning of frame 22. Frame header section 32 immediately follows start-of-frame section 30 and is used to store information related to frame 22, including routing information for frame 22 such as a source address and a destination address. Frame header section 32 also includes the type of frame 22, an identification number associating a frame with a plurality of additional frames, and additional identification numbers.

According to the invention, a plurality of types of frames are available. Example types of frames include frames used to transfer control information only, frames providing transfer of basic data, frames to transfer video data, and frames establishing a Fibre Channel link; however, other types of frames are also utilized. Each different type of frame is uniquely identified by frame header 32. Frames 22 are broadly divided into two categories: asynchronous frames and isochronous frames. Isochronous frames are generally used to transfer user data and provide deterministic transmission. Asynchronous frames are generally used for purposes of network initialization, determination of which node 12 will serve as master node 16, maintenance, and repair. Asynchronous frames are transmitted only when isochronous frames do not occupy all available bandwidth. The time for asynchronous transmission from a given node 12 is not predetermined, deterministic, or periodic, but, as described above, is bounded by the time period T. Asynchronous transmissions end at the beginning of the next integer multiple of time T. The type of frame designated in frame header section 32 indicates whether frame 22 is asynchronous or isochronous. Transmission of isochronous frame types is referred to as isochronous service. Transmission of asynchronous frame types is referred to as asynchronous service.

Cyclical redundancy check (CRC) section 36 immediately precedes end-of-frame section 38 and is used to detect transmission errors. End-of-frame section 38 is a delimiter that designates the end of frame 22.

Data payload section 34 in an isochronous frame 22 comprises a plurality of channels or slots 40 for transmitting data within network 10. In the illustrated embodiment, each slot 40 is capable of storing a long word, or 32 bits, of data. According to the invention, one or more nodes 12 has access to each slot 40, and the nodes 12 having access to specific slots 40 are specified by the type of frame 22 designated in frame header section 32. Depending on the type of frame 22, a node 12 may or may not be permitted to write to, and may or may not be permitted to read from, that same slot.

A frame's type is distinguished by its update rate or periodicity (where asynchronous frames can be thought of as having an update rate of 0) as requested by an upper layer application (not explicitly shown) and the size of the requested transmission at a specific update rate by an upper layer application. Transmission of a plurality of frames 22 is described in greater detail below in conjunction with FIG. 3.

Figure 3:
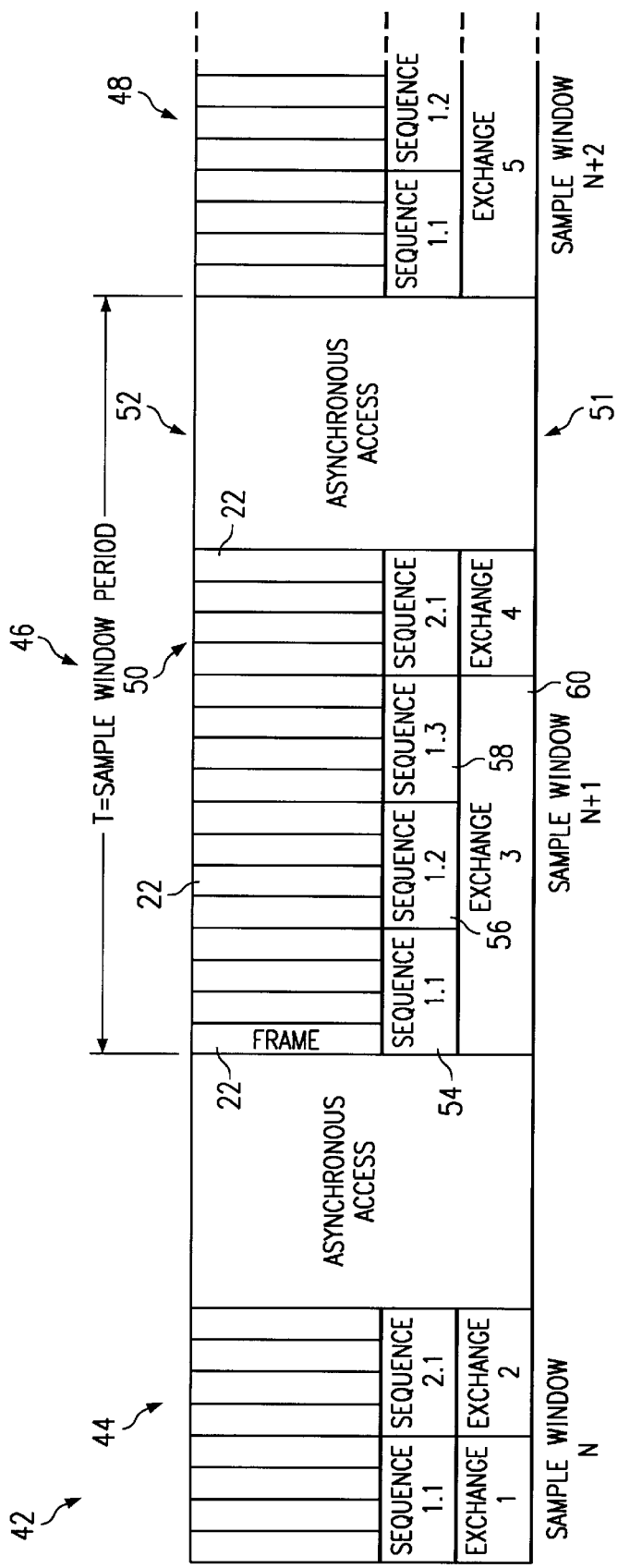
FIG. 3 is a diagram illustrating a data stream incorporating the frame of FIG. 2.

FIG. 3 is a diagram illustrating a data stream 42 showing three sample windows of time 44, 46, and 48 for transfer of data. A master node 16 transmits a grouping of isochronous frames 22 at a given maximum rate, for example, one maximum rate may be 16 khz. However, a master node 16 may be adjusted to transmit at a different maximum rate. For a rate of 16 khz, the time, or sample time, between transmissions of sequential groups of isochronous frames 22 is 62.5 microseconds. This time period is referred to as a sample window period or sample window. During a sample window, such as sample window 46, data may be transferred during an isochronous portion 50 of window 46 utilizing a plurality of isochronous frames 22. The transmission of isochronous frames 22 has the highest priority and is therefore transmitted first at the beginning of the period. Since isochronous service has highest priority, bandwidth is first allocated to isochronous service during any given service window prior to allocation of bandwidth to asynchronous service.

Asynchronous service utilizes asynchronous portion 51 within window 46. Thus the percentage of bandwidth left to accommodate asynchronous service is that which remains after all isochronous service frames have been scheduled for that specific window. This percentage can vary from one window to the next. This variance can occur because different isochronous types can be scheduled at different rates.

According to one embodiment, sixteen different isochronous frame types are available. When transmitted, a given type of frame is allocated a portion of a sample window's bandwidth.

Because of this programmability feature, scheduling of frames is intelligently determined at a consistent set of intervals as well as initial start times for each type in order to avoid a schedule conflict. Scheduler 76, shown in FIG. 4, 5, and 6 and described in greater detail below, permits schedule conflicts to be arbitrated by allowing the higher priority task to be accommodated and lesser priority tasks to be deferred until a later time. Normally this will allow the schedule to settle to a periodic distribution, assuming that bandwidth is not over allocated.

Frames are grouped into sequences, such as sequences 54, 56, and 58 illustrated in FIG. 3, and sequences are grouped into exchanges, such as exchange 60. Both sequences and exchanges are data structures that are defined in ANSI X3.230 rev 4.3. A sequence represents a series of frames with common characteristics such as the application that the data is used for and the error policy that is to be used with the data. Frames of the same type might typically be packaged into the same sequence. As an example, one sequence might represent a set of video frames. Each video frame might represent a single digitized sample of an image produced by a camera. Multiple frames might each represent a single digitized sample of an image each produced by one of multiple cameras. Each of these samples may be destined for a different monitor device. Together these samples are packaged into what might be considered a video sequence. This sequence might encompass all the video being routed by the system at a given time. Another sequence might be the samples of audio associated with the aforementioned video. Again multiple audio samples may be produced by multiple audio sources in the system. This might be considered the audio sequence. Together the audio sequence and the video sequence might be packaged into an exchange that may be thought of as the video teleconference exchange.

As described, a master node 16 is responsible for originating isochronous frames 22 that are received and retransmitted by the network nodes around the loop. This frame origination is performed in a manner consistent with the required rates for transmission of each type of isochronous frame 22. For each sample window, which in one embodiment is 62.5 microseconds long, master node 16 originates a series of frames 22 one at a time in sequence. These frames 22 are sequentially transmitted to the next downstream node 12.

During each sample window, the master node 16 determines the series of frames 22 to be transmitted during the pending window. Each category of data to be transmitted is represented by a separate sequence 54, 56, and 58 with a unique sequence identification number. The sequence identification number is assigned according to rules specified in Fibre Channel FC-PH. In turn, the set of sequences 54, 56, 58 to be transmitted in a unique window is organized into an exchange 60.

Different categories of frames 22 each have a defined bandwidth which is equal to the size of each frame multiplied by the frame's update rate. Service is provided to each category based on bandwidth availability and priority. In one embodiment, audio data by default has the highest priority, and as such, is transmitted each service window.

The size of sample window 46 is determined, according to the illustrated embodiment, by one of two methods. According to one method, the size of the window is derived from an external 16 khz clock source (not explicitly shown). According to the second method, the size of the window is derived from an internal clock source.

Dividing each sample window period, such as periods 44, 46, and 48, into isochronous transmission portion 50 and asynchronous transfer portion 51 allows full use of available bandwidth. This full usage occurs because where bandwidth for isochronous transfer is not required, asynchronous access is allowed for the remaining of the sample window period. Thus, for a given bandwidth capability of a fiber cable, a greater amount of information may be transferred according to the invention. Network interface unit 28 schedules transmission of frames 22 illustrated in FIG. 3 and also controls insertion of information into and extraction of information from frames 22. Network interface unit 28 is described in greater detail below in conjunction with FIG. 4.

Figure 4:
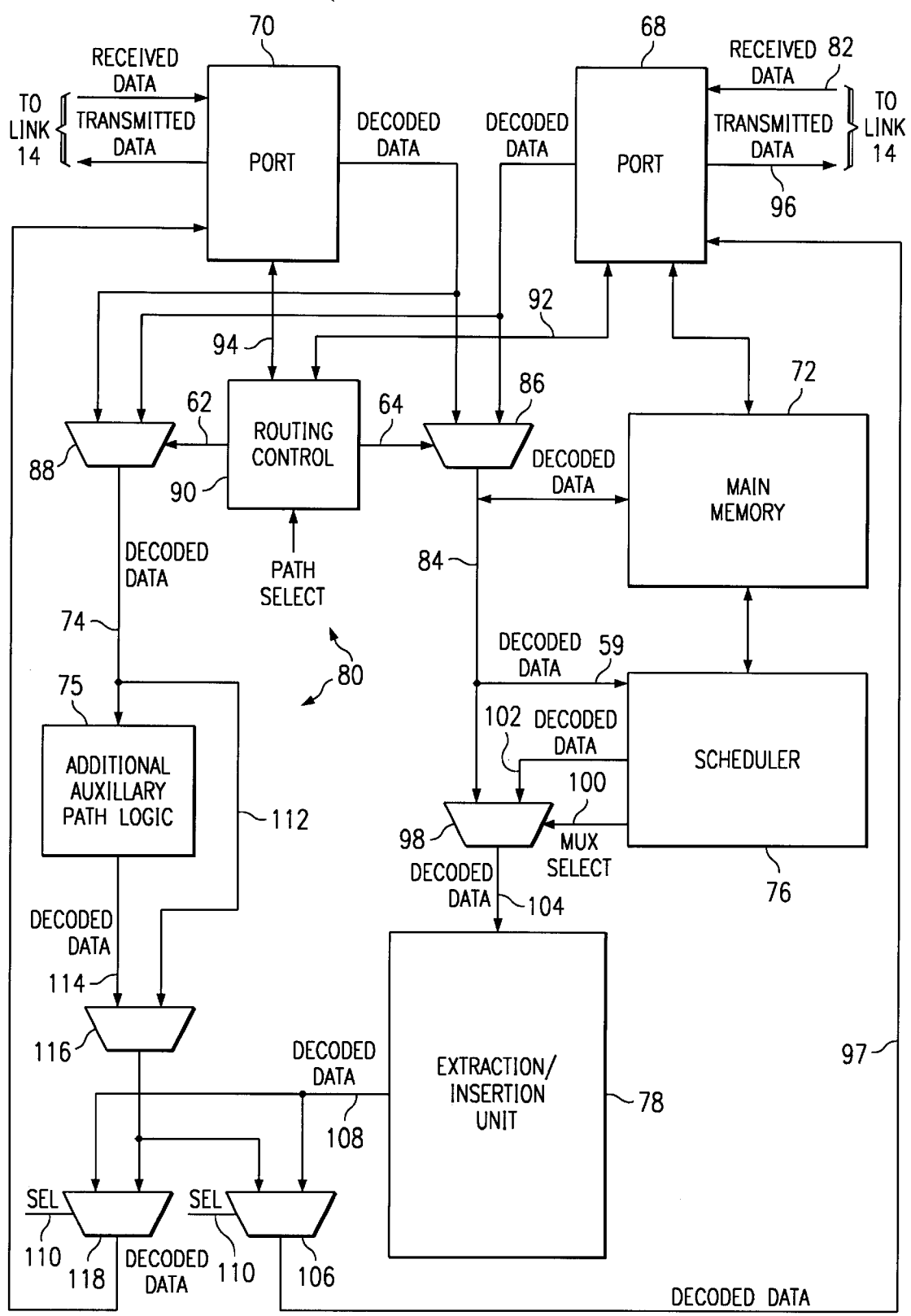
FIG. 4 is a block diagram of a network interface unit in a node of the network illustrated in FIG. 1.

FIG. 4 is a block diagram of network interface unit 28. Network interface unit 28 performs the function of inserting data into frames 22. In addition, network interface unit 28 within master node 16 schedules transmission of frames 22 according to the protocol illustrated in FIG. 3. Network interface unit 28 includes ports 68 and 70, a main memory 72, an auxiliary path 74, additional auxiliary path logic 75, a scheduler 76, an extraction/insertion unit 78, as well as associated circuitry 80 connecting these elements.

Port 68 receives data on a path 82 as a part of the link 14. Port 68 identifies frames 22 within the received data and decodes the identified frames into a format understandable by network interface unit 28. The decoding of a frame 22 includes examining frame header 32 and identifying a frame as an asynchronous frame or an isochronous frame. According to one embodiment, port 68 is a Fibre Channel node port, which is sometimes referred to in the art as an "N_Port." Port 68 is capable of both transmitting and receiving frames 22 and therefore provides a bi-directional interface between nodes 12 of the network 10.

In one embodiment of the invention, each node 12 includes a clock (not explicitly shown) for timing purposes. Due to any differing between the times generated by these clocks, input data overflow or under flow could occur. Therefore, each port 68, 70 provides elasticity buffering to accommodate input data overflow or underflow that occurs within the lifetime of a frame 12 and attempts to recover the difference by adjusting the perceived number of fills received. While each port 68, 70 transmitter attempts to maintain a consistent number of fill characters between frames, the eventual accumulation of clock difference between the receive and transmit clock domains requires a character, taken to be a fill, to be deleted or inserted. Each node supports a smoothing algorithm to account for the difference in clock domains passing from node to node 12.

Differing numbers of fill characters between frames as they are passed between loop nodes are a source of frame rate jitter for isochronous traffic. The more the number of idles differs, the more potential frame rate jitter that is added to the isochronous service. The effect that this jitter has on the ability of the loop to distribute isochronous traffic is application dependent.

In order to insure proper operation of isochronous traffic on the loop, each node maintains a consistent number of idles between frames 22 and the number of idles are matched as closely as possible between all nodes 12 on the loop.

The decoded information generated by ports 68, 70 is transmitted in one embodiment, by one of two paths: a main path 84 and auxiliary path 74. Main path 84 is utilized during normal operation and provides both isochronous and asynchronous service. Auxiliary path 74 provides reception or origination of asynchronous communication. In addition, auxiliary path 74 provides a "loopback" mode of operation in which data may be routed back around network 10 to bypass a break-in network 10. This mode of operation is described in greater detail below. To select the appropriate path, data decoded by port 68 is provided to multiplexers 86 and 88 that form a part of associated circuitry 80. Associated circuitry 80 also includes a routing control unit 90 that functions to select whether the decoded information is transmitted to auxiliary path 74 or to main path 84. Routing control unit 90 receives information from either port 68 over a signal line 92 or from port 70 over a signal line 94. Information on signal lines 94 or 92 indicate the appropriate path and selects multiplexer 86 or multiplexer 88 to provide the correct path for data transmission.

In addition to acting as a port for receiving data, port 68 acts as a port for transmitting data. Port 68 receives information, for retransmission to other nodes 12 of network 10, from other portions of network interface unit 28 on a signal line 97 and transmits that information in an encoded format over a path 96 as a part of link 14 for reception by other portions of network 10. Port 70 is identical to port 68. During normal operation, one port 68, 70 receives information and the other port 68, 70 transmits information.

If main path 84 is selected, frames 22 are provided over main path 84, which may include main memory 72, scheduler 76, and extraction/insertion unit 78. An isochronous frame 22 on the main path 84 may take a plurality of routes. In a first case, a frame 22 travels directly from multiplexer 86 through a multiplexer 98 to extraction/insertion unit 78. The traveling of data directly to extraction/insertion unit 78 is referred to herein as "wormholing." This case occurs when input/output unit 24 is part of slave node 12. Although frame 22 travels directly to extraction/insertion unit 78, a copy of frame 22 is made and stored in main memory 72. This copy is made because, if a frame error occurs, the frame contents may be available for diagnostic purposes. According to a second case, an isochronous frame 22 is stored in main memory 72 until needed for subsequent transmission to extraction/insertion unit 78. This case occurs when network interface unit 28 is part of master node 16. Asynchronous frames 22 are stored in main memory 72 until bandwidth is available, at which time they are retransmitted.

Scheduler 76, within a master node 16, operates to schedule transmission of all isochronous frames transmitted and received in network 10. If the node in which scheduler 76 resides is not master node 16, multiplexer 98 is selected by a multiplexer select signal on line 100 provided by scheduler 76 to continue transmission of data on main path 84. However, if scheduler 76 is operating within master node 16, the multiplexer select signal on the line 100 selects data on a line 102 from scheduler 76. The data on the line 102 includes frames 22 stored in main memory 72 including headers generated by scheduler 76. The selected data sent to multiplexer 98 is provided to insertion/extraction unit 78 as signal 104. Scheduler 76 also selects data on line 102 when transmitting asynchronous data at either a node 12 or a master node 16. Determination of the availability of an opportunity to begin asynchronous transfer is determined based on interpretation of frame arrival warning information on a line 59, as described in greater detail below.

Scheduler 76, when operating in a master node 16, controls the timing of transmission and retransmission of frames 22 across network 10 in order to establish isochronous communication between nodes 12. Scheduler 76 creates the schedule by using a scheduling algorithm in conjunction with a schedule table, which are described in greater detail below. Scheduler 76 constructs the schedule table upon initialization of network 10 by processing initial bandwidth allocation requests from each node 12. Scheduler 76 also initiates asynchronous frame transmission utilizing bandwidth remaining following allocation to isochronous services according to the requirements of each node 12. The isochronous transmission schedule determines the periodic times at which the frame 22 is transmitted from master node 16 and subsequent retransmission times. After traveling around network 10, the frame 22 is held at master node 16 until the appropriate time for retransmission. Thus, scheduler 76 enables isochronous transmission by establishing a deterministic schedule controlling the movement of frame 22 around network 10. When operating in both master node 16 or non-master node 12, scheduler 76 also controls the transmission of asynchronous frames 22. Between time periods beginning with the end of one isochronous exchange and the beginning of another and during programmable isochronous time gaps when isochronous service is determined to have been lost, scheduler 76 may transmit asynchronous frames. During certain idle periods when a node 12 retransmits frames 22 without processing, scheduler 76 may use the timing gaps to transmit asynchronous frames 22. These idle periods are described in greater detail below in conjunction with FIGS. 5 and 6.

Extraction/insertion unit 78 reads data from or inserts data into slots 40 within data payload 34 of isochronous frames 22 according to the type of frame. This insertion or extraction process occurs while frames 22 are progressing through the extraction/insertion unit 78. Extraction/insertion unit 78 does not insert data into or extract data from asynchronous frames. Extraction/insertion unit 78 processes received frames 22 by use of an access table. The access table defines which nodes 12 may read or write to which slots 40 and is described in greater detail below with reference to FIGS. 10 and 11. The access table is based upon the initial frames 22 constructed by scheduler 76 according to requirements of initial bandwidth requests from nodes 12. Using the access table, extraction/insertion unit 78 inserts and extracts data within slots 40 assigned to its node 12. Extraction/insertion unit 78 operates without regard to the master or non-master operation mode of its node 12. The output of extraction/insertion unit 78 is provided as signal 108.

Multiplexers 106 and 118 receive signal 108 and the output of multiplexer 116 and are selected by a select signal on a line 110. Signals on the line 110 select multiplexer 106 or 118 to provide decoded data to the currently operating port 68 or 70. The decoded data is then provided to either port 68 or port 70, where it is encoded for transmission to the next node 12 according to the schedule designated by scheduler 76 of master node 16.

If auxiliary path 74 is designated by port 68 or port 70, data is provided to additional auxiliary path logic 75. After progressing over auxiliary path 74 through additional auxiliary path logic 75, data on an output line 114 is provided to a multiplexer 116. Multiplexer 116 provides either data from data path 112 or data from additional auxiliary path logic 75 to multiplexer 118 and multiplexer 106. Multiplexers 118 and 106 are selected by either port 68 or 70 to return data to the correct port 68 or 70 for retransmission.

As described above, auxiliary path 74 is utilized during a "loopback mode." Loopback mode is a mode whereby the main data path 84 is associated with both the receiver and also the transmitter from the same port 68, 70. Multiplexer 86 is used for selecting the receiver. Multiplexer 106 and 118 are used to route data to be transmitted by the corresponding port 68, 70. There are two cases for loopback mode. Case 1 occurs where main path 84 is associated with the upstream port 68 or 70. In either case, while in loopback mode, auxiliary path 74 is associated with the other port 68, 72. Thus for case 1, auxiliary path 74 is used to communicate via the downstream port and for case 2, the auxiliary path 74 is used to communicate via the upstream port.

When a break occurs to one of the links 14 one of these two cases of the loopback mode is entered. If the break occurs on the downstream port, that means that the data, upon transmission needs to be routed back on the reverse direction of the upstream port. Since it is desired that the node 12, which is still communicating with networks, maintain its ability to process isochronous data, then the main path 84 must be associated with the upstream port (68 or 70). Conversely then if the break occurs upstream, then the main path 84 must be associated with the downstream port.

Thus network interface unit 28, when acting within master node 16, receives frames 22 of data and provides those frames to main memory 72 for storage until retransmitted according to a schedule administered by scheduler 76. Network interface unit 28, when operating within master node 16, additionally initiates transmission of frames 22 around network 10 according to the schedule administered by scheduler 76. When operating within a slave node 12 or master node 16, network interface unit 28 receives frames 22 transmitted within network 10, stores a copy of the frame in main memory 72, and inserts data into or extracts data from slots 40 of frames 22. Frames 22 are then transmitted out of port 68 or 70 to the next node 12 in network 10. A frame 22 halts at master node 16 and is retransmitted at the appropriate time. Scheduler 76 is described in greater detail in conjunction with FIGS. 5 or 6.

Figure 5:
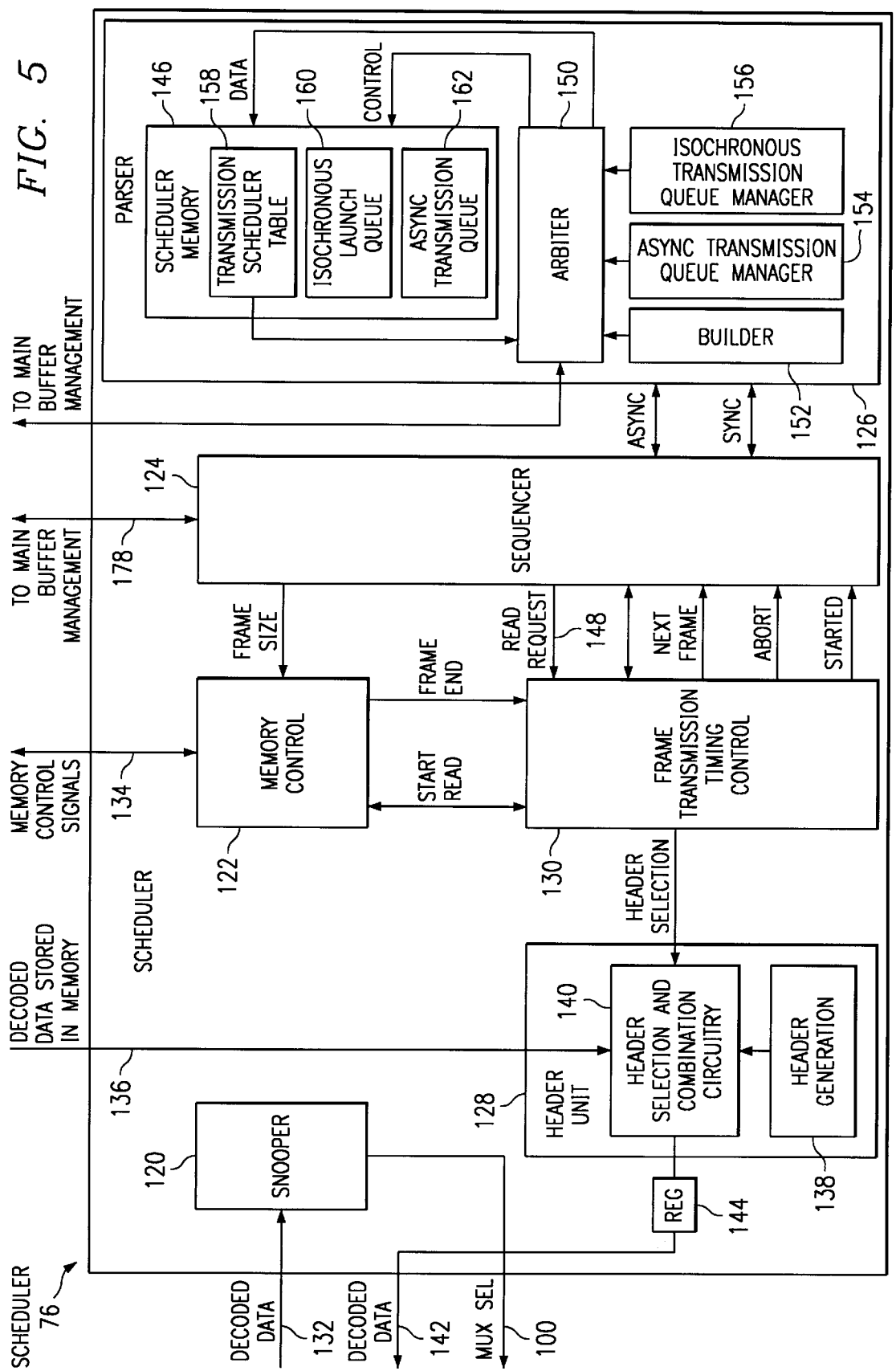
FIG. 5 is a block diagram of a scheduler unit of the interface unit illustrated in FIG. 4.

FIG. 5 is a block diagram of scheduler 76 of FIG. 4. Scheduler 76, is responsible for frame initiation for frames 22 generated on main path 84 for a node 12. For all nodes 12, scheduler 76 initiates asynchronous frames 22 as may be required and as network availability affords. In the case of a master node 16, scheduler 76 also is responsible for the initiation of frames 22 required to support isochronous frame service. In one embodiment of the invention, scheduler 76 affords a technological advantage by sharing hardware resources between these related, but otherwise independent services. Scheduler 76 is also responsible in nodes 12 for determining availability of the network.

Scheduler 76 includes a snooper 120, a memory control unit 122, a sequencer 124, a parser 126, a header unit 128, and a frame transmission timing control unit 130. Snooper 120 is only active in slave nodes 12 and is not active in master node 16. In one embodiment, snooper 120 within scheduler 76 monitors the data path of decoded data 59 to determine whether a frame 22 is currently in progression through the main data path 84, as being received at port 68 or port 70. Snooper 120 thus monitors port 68 or port 70 for signaling information that a frame reception is beginning. This is performed by monitoring data path 59 for signaling information indicating start-of-frame 30. Snooper 120 continues to monitor the decoded data path 59 to determine when the frame 22 reception is complete. This determination that reception of a frame 26 is complete is made by monitoring the data path 59 for signaling information indicating end-of-frame 38.

Determination of frame arrival at a port 68 or port 70 is important because a frame does not stop in port 68 or 70. In one embodiment, frame 22 stores between 0 and 528 long words (2112 bytes) of payload data, in addition to additional data requirements of the other portions of a frame 22. Thus, in one embodiment of the invention, as many as 265 clock cycles are required to transfer a frame past scheduler 76 on data path 84. Since frame 22 does not stop at any place in node 12 but is "wormholed" through, a continuous data pipeline exists from input to output through interface 28. Thus specific signaling information only exists at one stage of the pipeline for exactly one clock cycle of the device. Additionally, since the pipeline depth in one embodiment of the invention is nominally less than twenty stages deep, only twenty words of a frame 22 exist within the physical confines of any given node at any moment. A maximum size frame thus may exist with parts of the frame spread across as many as twenty-seven consecutive nodes 12. Hence, at snooper 120, the frame status is maintained as the frame 22 proceeds to "wormhole" through the node 12.

Snooper 120 is responsible for identifying frame traffic of isochronous frames 22. At the conclusion of an exchange of isochronous traffic associated with sample window 46, such as exchange 54, snooper 120 determines availability of network 10 by detection of an end-of-exchange indication contained in the last frame 22 of the exchange. At this point, snooper 120 signals availability for asynchronous traffic to sequencer 124. Snooper 120 produces a multiplexer select signal on line 100 that selects data received by scheduler 76 from main memory 72 when asynchronous data may be inserted into a sample window 46.

Memory control unit 122 provides memory control signals on a line 134 to main memory 72 to control the transmission of data stored in main memory to scheduler 76 for transmission to extraction/insertion unit 78. Frames 22 are stored in main memory 72 until scheduler 76 determines they should be transmitted. When it is determined that frames 22 should be transmitted, memory control 122 provides memory control signals on line 134 to main memory 72 to initiate transmission of data over a path from main memory 72 to header unit 128 of scheduler 76.

Frame transmission timing control 130 coordinates with memory control 122 to initiate transmission of frames 22 over a path 136 at an appropriate time. The times for transmission of frames 22 over path 136 is determined by sequencer 124, as described below.

Header unit 128 receives a frame 22 over path 136 from main memory 72 and generates a new header for that frame 22 by operation of a header generation unit 138. Additionally, header selection and combination circuitry 140 selects the appropriate header for frame 22 and combines the header with the remainder of frame 22 for transmission to extraction/insertion unit 78 over a path 142. As illustrated, the result of the combination is first provided to a register 144 for timing purposes. Header selection and combination circuitry 140 selects an appropriate header from reserved header storage buffers within main memory 72. For each frame payload buffer reserved in main memory, there is a corresponding header storage buffer. In one embodiment, there are 31 payload buffers and 31 header buffers. Each header buffer stores a header as well as status information on the frame. For isochronous frames, most of the information in the header is regenerated upon transmission. For asynchronous frames, the header information is derived directly from the header buffer for the frame.

Sequencer 124 determines when frames 22 should be transmitted by examining the contents of a scheduler memory 146 in parser 126. When frames 22 are ready for transmission, sequencer 124 provides read request signals on a signal line 148 to frame transmission timing control 130 to initiate transfer of frames 22 from main memory 72 on path 136 for reception by extraction/insertion unit 78.

Parser 126 includes scheduler memory 146, an arbiter 150, a builder 152, an asynchronous transmission queue manager 154, and an isochronous transmission queue manager 156. Stored within schedule memory 146 is a transmission schedule table 158, an isochronous launch queue 160, and an asynchronous transmission queue 162. These tables are all maintained for master node 16. Other nodes 12 only utilize asynchronous frame transmission queue 162.

Parser 126 builds a list of frames 22 to be launched by sequencer 124. Builder 152 reads and interprets transmission schedule table 158 within parser 126 and reschedules transmission of frames 22 if a conflict exists in a designated schedule. A conflict may arise due to over allocation of bandwidth for the current sample window 46. Isochronous transmission queue manager 156 controls construction and modification of isochronous launch queue 160. Asynchronous transmission queue manager 154 controls construction and modification of asynchronous launch queue 162.

In one embodiment of the invention, a common memory array is shared between transmission schedule table 158, isochronous launch queue 160, and asynchronous queue 162. Arbiter 150 arbitrates access to that common memory array by various elements within interface 128 that require information within the array. Arbiter 150 is utilized in one embodiment of the invention because the common memory array is implemented with one single port isochronous SRAM macrocell, which means that at any one moment in time only one read or one write operation can occur from or to that macrocell.

The functional units that access tables 158, 160, and 162 and benefit from the use of arbiter 150 are builder 152, asynchronous transmission queue manager 154, and isochronous transmission queue manager 156. Builder 152 is responsible for interpretation of transmission schedule table 158 and building a list of isochronous service sequences to be transmitted in the pending sample window 46. This list for the current window as well as a list for a pending window are assembled in isochronous launch queue 160. Therefore, builder 152 is always working one sample window 46 ahead, building a list of sequences of frames for the next window while the current window is occurring.

Isochronous transmission queue manager 156 is responsible for obtaining the list of sequences of frames stored in isochronous launch queue 160 and sequentially processing them for transmission. This is performed through signaling with main buffer management 176 to discover whether a sequence of frames of a given type has been received and a corresponding buffer pointer chain is queued in an isochronous receive queue FIFO 196, illustrated in FIG. 7. In one embodiment of the invention, isochronous receive queue FIFO 196 is divided into sixteen two-deep FIFOs, each corresponding to one of the defined isochronous frame types. Thus there is one individual two-deep FIFO for each of the isochronous types indexed by type. If a sequence of frames of a given type is available in a corresponding FIFO, then that condition is signaled to sequencer 124, which is then responsible for insuring transmission of that sequence of frames. If a sequence of frames of a given type is not available in a corresponding FIFO, then that condition is signaled to sequencer 124, which is then responsible for initiating a new sequence of frames of that type with a null or empty payload consisting of all zero data values. A sequence of frames is then generated of the appropriate designated size to provide data storage for later insertion as the frame traverses the network. This sequence initiation is performed upon network initialization or on the occurrence of an error that results in the loss of the sequence.

Asynchronous transmission queue manager 154 reads individually queued frame buffer pointers from asynchronous transmission queue 162. These are subsequently used to address a main memory cluster 182 to identify a specific address range corresponding to a memory buffer associated with an individually queued buffer pointer. Frame transmission timing control 130 implements signaling to initiate and terminate reading of the data payload 34 corresponding to an individual frame 22 from main memory cluster 182. Specific word locations within the memory space allocated to that specific buffer are generated by memory control 122.

Frame transmission timing control 130 also generates signaling information to the header unit 128. Header unit 128 is responsible for regeneration of frame header information for isochronous frames 22 only. In one embodiment of the invention, frame headers 32 are generated according to rules specified in Fibre Channel FC-PH. This header information is used to identify a frame and to determine how recipient nodes 12 process the frame 22.

Figure 6:
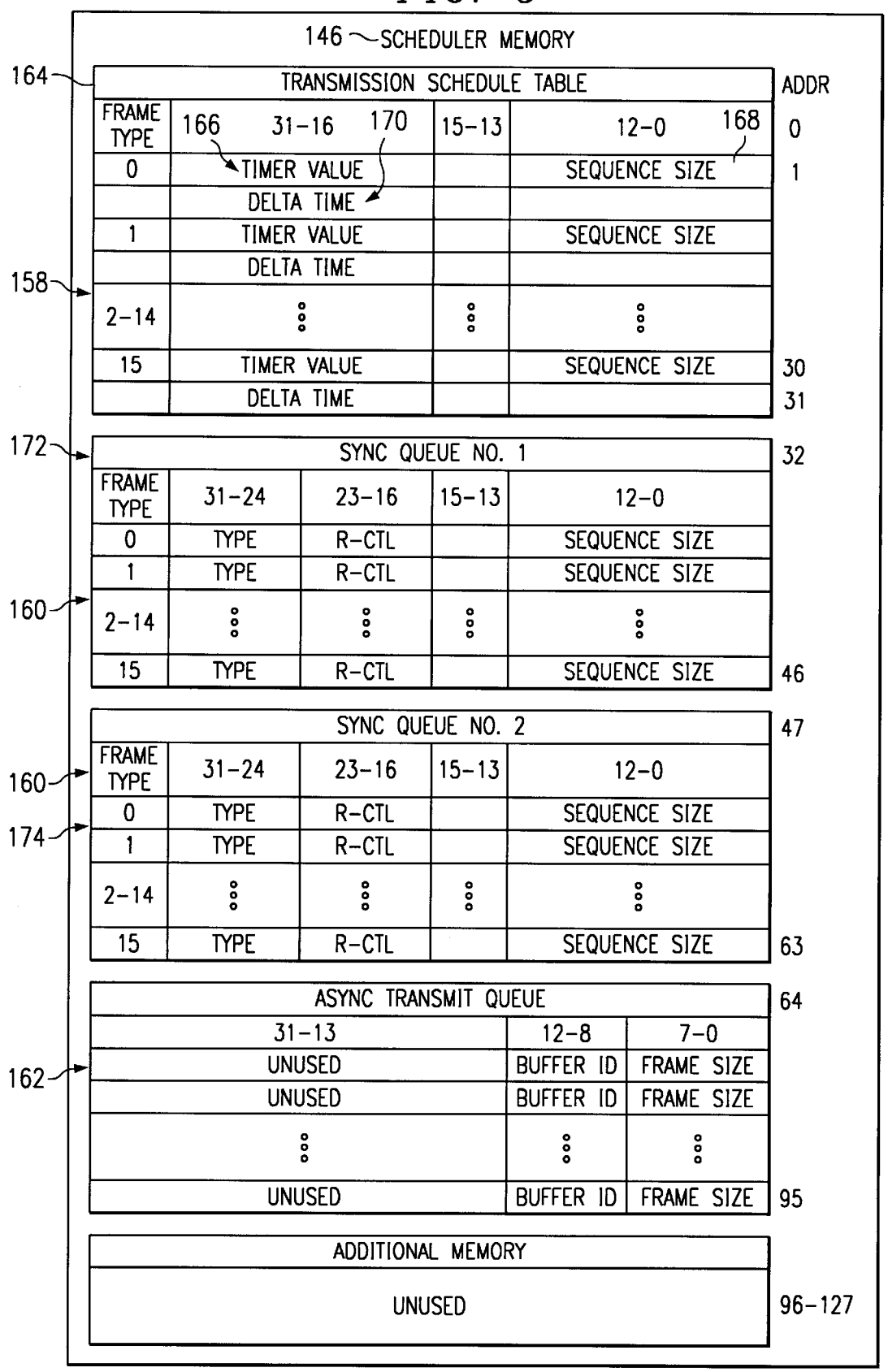
FIG. 6 is a diagram of information in a scheduler memory in the scheduler unit of FIG. 5.

FIG. 6 is a diagram illustrating scheduler memory 146. To accomplish scheduling the origination or retransmission of isochronous frames from master node 16, scheduler 76 stores transmission schedule table 158, isochronous launch queue 160, and asynchronous transmission queue 162. Transmission schedule table 158 is organized by scheduling priority type and is searched sequentially by builder 152. According to one embodiment, transmission schedule table 158 includes information for sixteen different frame types. The type of frame is indicated in the left-hand column 164 of transmission schedule table 158.

According to one embodiment of the invention, transmission schedule table 158 is stored at memory locations 0 through 31 of scheduler memory 146. Each memory location of scheduler memory 146 may store 32 bits of data. For a first frame type, a timer value 166 is stored in bits thirty-one through sixteen of address location zero of scheduler memory 146. Timer value 166 indicates the next window 44, 46, 48 in which frame 22 having that frame type will be transmitted.

At bits twelve through zero of address location zero a sequence size 168 is stored for the first frame type. A timer value 166 of one indicates that frame 22 will be transmitted in the next window 44, 46, 48 and a timer value 166 of two indicates that frame 22 will be transmitted in the second next window 44, 46, 48. Sequence size 168 is the sum of the payload sizes of all of the constituent frames of the sequence.

At bit positions thirty-one through sixteen of address location two of scheduler memory 146, a delta time 170 is stored. Delta time 170 indicates how frequently frame 22 is retransmitted. A delta time 170 having a value of one indicates frame 22 will be retransmitted during each window. Timer value 166, sequence size 168, and delta time 170 are provided in schedule memory 146 for each frame type 164. Additional information may be provided in bits 15 through 13 of address locations 0 through 31 of scheduler memory 146 for use by transmission schedule table 158. In this manner, by generating frames 22 having a particular header, including a particular frame type, different size sequences may be transmitted in addition to transmitting frames at different rates. This is desirable because different types of information require updates at individualized rates. This mechanism allows a broad range of degrees of freedom to facilitate tailoring of isochronous service to meet a broad range of customized bandwidth and update rate requirements.

Synchronous launch queue 160 is stored, according to one embodiment, at memory locations thirty-two through sixty-three of scheduler memory 146. Isochronous launch queue 160 includes a first isochronous queue table 172 and a second isochronous queue table 174. Each of these queue tables 172 and 174 is used first for the purpose of building a list of isochronous service types to be launched during an upcoming service window, and then is used to keep track of those currently being launched. Thus, one queue table 172, 174 is in use while the other is in use for transmission of data.

An additional function of scheduler 76 is to maintain asynchronous transmission queue 162. This queue consists of a first-in-first-out queue of single frame entries of frames 22 to be initiated during open times between isochronous service windows where there is unoccupied bandwidth. Each entry in the asynchronous transmission queue 162 corresponds directly to a buffer in main memory 72, which stores frame 22 to be transmitted.

The operation of scheduler 76 is described below with reference to FIGS. 4, 5, and 6. In initiating isochronous service, scheduler 76, and therefore parser 126, if acting within master node 16, is prompted to parse transmission schedule table 158. The parsing of transmission schedule table 158 starts with the highest priority value and proceeds to the lowest until all bandwidth for a particular window is used or there are no more matches. Parser 126 maintains a wrapping window count. This wrapping window count is compared to timer values that are stored for each type of frame 22 stored by builder 152. If a match occurs, the type is added to queue table 172 or 174 of isochronous launch queue 160. Additionally, the type delta time 170, which indicates the number of windows before rescheduling, is added to the current time and stored in the timer value 166. For example, a type that is scheduled to be transmitted in each and every window 44, 46, 48 will have a delta value of 1. As isochronous launch queue 160 is being built, sequencer 124 keeps track of the sequence sizes of each sequence added to isochronous transmission queue 160. The total sequence size is compared to a pre-programmed constant. If the pre-programmed constant is exceeded, then the sequence does not fit into a window 44, 46, 48, and a value of 1 is added to the time value at the sequence to increment the sequence by one time window 44, 46, 48.

Figure 7:
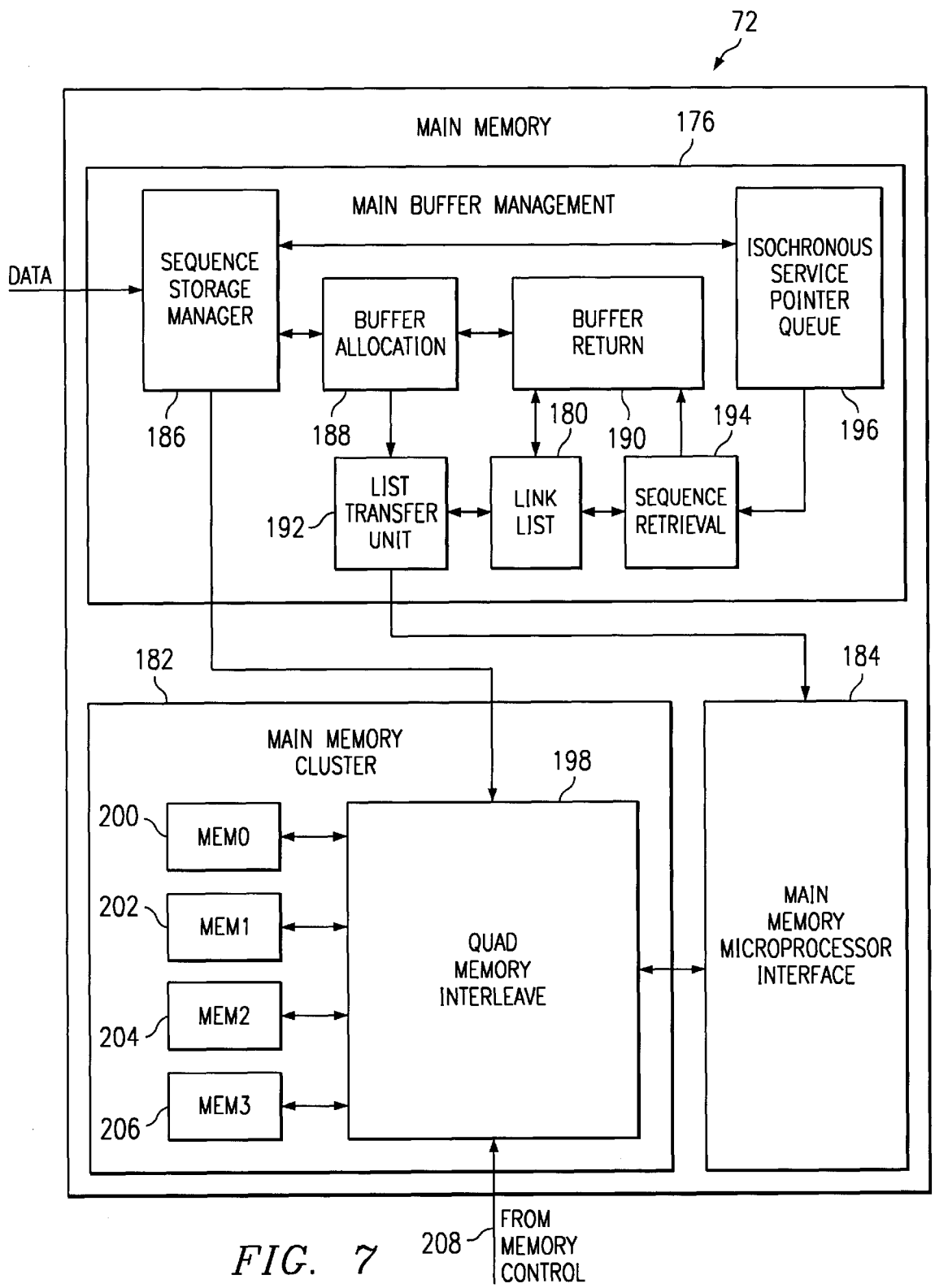
FIG. 7 is a block diagram of a main memory unit of the interface unit of FIG. 4.

When working off isochronous transmission queue 160, sequencer 124 takes every entry one at a time and first determines if there is a sequence of that type that have been previously received within main memory 72 and are awaiting retransmission. Referring to FIG. 7, operationally the sequencer 124 interacts with a main memory buffer management 176 to maintain a set of queues organized by type each containing pointers to the head of each sequence. This interaction is performed over a path 178. If there is an entry for that type, then scheduler 76 causes that sequence to be transmitted. If there is no sequence of a particular type awaiting retransmission, then scheduler 76 generates a same size sequence having null or zero-value characters in the payload.

Scheduler 76 also accommodates the transmission of asynchronous frame traffic. Asynchronous frames are generally originated from microprocessor 26 for control purposes and are stored in main memory 72. Asynchronous frames can be used to transfer a variety of data not requiring deterministic performance, or of a low priority. Non-time critical functions can be accommodated with bandwidth remaining after time critical applications have been serviced. Asynchronous frames are normally used to accommodate various network maintenance tasks, for example. All asynchronous traffic is originated by microprocessor 26, so data from terminal 18 to be put into the network asynchronously is routed through microprocessor 26 to the network interface 28. When microprocessor 26 has finished updating frame 22, the frame is automatically put into asynchronous transmission queue 162 by asynchronous transmission queue manager 154. Snooper 120 and sequencer 124 attempt to find unused time at the end of windows such as window 46 or unused windows to transmit information stored in asynchronous transmission queue 162. In the event of incoming isochronous traffic, sequencer 124 aborts the current asynchronous frame and re-transmits it at a later time.

Auxiliary data path 74 of FIG. 4 also has an auxiliary scheduler associated with an auxiliary memory (not explicitly shown). This auxiliary scheduler does not support isochronous service generation, but does support asynchronous frame traffic. Thus, main memory 72 may support both isochronous and asynchronous frame traffic while the auxiliary path is provided to support asynchronous traffic only.

Scheduler 76 is also responsible for multiplexing information into main data path 84. When scheduler 76 is part of a master node 16, multiplexer 98 blocks data received along path 84 so that data may only originate from scheduler 76 along path 102. Thus, multiplexer 98 is a blocking multiplexer in this context. Therefore, data may only originate on the scheduler path. When scheduler 76 resides in a slave node 16, scheduler 76 selects multiplexer 98 to allow transmission of data along main path 84 and for insertion of asynchronous data. In the slave node case, however, asynchronous data may be inserted during periods between isochronous exchanges, as available, and provided that other, received asynchronous frames 22 are not already progressing through node 12 while data is progressing through node 12. This selective insertion utilizes some predictive signaling from the receiving port 68 or 70 so that if an asynchronous frame is initiated by scheduler 76 and an isochronous frame 22 is detected incoming, then the currently transmitted asynchronous frame is aborted in time to insure the minimal number of idle clock cycles between frames.

If an asynchronous frame is aborted, then it may be retransmitted at the next available opportunity. If the number of retransmissions exceeds a pre-programmed limit, then the frame is discarded and an error interrupt is generated to microprocessor 26 so that corrective action may take place.

Two distinct layers are available for the allocation of bandwidth within isochronous service. First, bandwidth can be allocated by allocating a sequence having one of the available frame types. This allocation consists of a sequence size 168 and a delta time 170. Delta time 170 represents the number of sample windows 46 before a frame is initiated again. For example, specifying a delta time of "1" indicates that the frame is initiated every sample window. Additionally, the initial value of a timer value 166 allows for an initial offset in sample windows prior to initiation of the first sequence frames of that type. Timer value 166 is compared to an internal count of sample windows 46. If the internal count matches, the size of the sequence is compared to the amount of time already allocated and hence time remaining for the pending isochronous sample window 46.

If there is sufficient available time, then the sequence of frames is added to isochronous launch queue 160. In this case, delta time 170 for that type is added to the current time and the result is stored in the transmission schedule table 158 as a new value for timer value 166. If there was not sufficient bandwidth left to accommodate successful transmission of the sequence in the upcoming sample window 46, then "1" is added to the current time and the result is stored as the new timer value 166. Otherwise, the delta time value 170 for that type from the table 158 is added to the present time and stored as the new timer value 166 for that type. This updating of timer value 166 causes the node to attempt to accommodate the sequence in the first window with sufficient bandwidth available and periodically thereafter according to the delta time value 170 for that type.

Transmission schedule table 158, in one embodiment of the invention, is searched sequentially starting with Type 0 and proceeding on until Type 15. Thus Type 0 has the highest priority and will be serviced first and Type 15 has the lowest priority and is accommodated only after all of the other isochronous service types have been serviced. This priority mechanism affords a recovery, to some extent, from poorly chosen initial allocation values.

After the various isochronous types in use have been defined, a second layer of bandwidth allocation is then provided by the invention. Each of the isochronous sequences constitutes a "box car" in which to place smaller bundles of data. Each frame is accordingly subdivided into individual long word size fields. As described above, these are referred to as "channels" or "slots" 40. A channel of a specific type can then be individually assigned to a particular application for transmission or reception of data. Channels can also be assigned in groups or blocks, or can be accessed in an arbitrary set. Consequently an isochronous sequence 54 of some specific type can carry data from and to a variety of application sources. Each channel 40 within the sequence 54 represents an independent communications channel.

As described in greater detail below in conjunction with FIGS. 10 and 11, a node 12 can be directed, for each type, as to which channels that it may access for read or write purposes. Protocols are provided to facilitate dynamic reallocation of these channels so that bandwidth can be readily allocated and reclaimed. In one embodiment of the design, microprocessor 26 is responsible for processing the protocol messages and providing re-configuration information to the interface 28.

Asynchronous frames are inserted essentially in the same manner in slave nodes as isochronous or asynchronous frames are inserted at the master node. Frames are retrieved from main memory 72 and multiplexer 98 is configured to permit that data to be transmitted to extraction/insertion unit 78. In master node 16, this path is always selected, whereas in the slave node, this path is dynamically altered. This dynamic selection is based on the detection on frames tunneling through node 12 on the bypass side of this multiplexer (originating at the receiving port.) Since this receiving port has pipelining incorporated to facilitate header interpretation, information can be fed "forward" indicating the arrival at the node of a frame that would be tunneling through the node. These frames are copied into main memory 72 and a corresponding buffer pointer is queued to a microprocessor receive queue.

If a conflict is detected by snooper 120 in a slave node 12 and the node 12 has begun origination of an asynchronous frame, then that frame is aborted and an End-of-Frame Abort termination character is generated at the transmitting port to prematurely terminate the frame 22. Scheduler 76 then retains the buffer pointer indicating the next asynchronous frame to transmit and simply awaits the next opportunity to transmit. As long as an isochronous service interval is ongoing, there is not sufficient time between frames for an asynchronous frame transfer to be initiated. At the conclusion of an isochronous exchange, if a sufficiently large gap is detected, scheduler 76 attempts to begin asynchronous transfer. An auxiliary scheduler (not explicitly shown) works in a manner analogous to scheduler 76, except that it can only schedule the origination of asynchronous frames.

The invention also allows dynamic allocation of bandwidth according to the needs of nodes 12. When particular nodes 12 require additional bandwidth, these nodes 12 transmit appropriate control signals to master node 16 for additional original isochronous frames 22 having appropriate priority and transmission rates. The dynamic allocation of bandwidth is advantageous because as system loading/utilization changes, the allocation of bandwidth should change correspondingly.

By providing a transmission schedule table that stores each possible type of frame along with the sequence size 168 and delta time value 170, a plurality of frames 22 may be selectively transmitted around network 10 at different rates, and these sequences may store varying amounts of information. This is particularly advantageous because it allows bandwidth allocation to be efficiently allocated to meet deterministic performance requirements under a larger variety of circumstances than other available systems. Additionally, because scheduler 76 searches for available bandwidth during each sample window 44, 46, 48, both isochronous and asynchronous transmission may occur within network 10. Thus, efficient bandwidth utilization is achieved.

FIG. 7 is a block diagram of main memory 72 within network interface unit 28. Main memory 72 includes a main buffer management unit 176, a main memory cluster 182, and a main memory microprocessor interface 184. Main buffer management unit 176 manages the storage of information in main memory cluster 182. Main memory cluster 182 provides locations for storage of data. Main memory microprocessor interface 184 provides an interface between microprocessor 26 and main memory 72 of any given node.

Main buffer management 176 includes a sequence storage manager 186, a buffer allocation unit 188, a buffer return unit 190, a list transfer unit 192, link list 180, a sequence return unit 194, and a isochronous service pointer queue 196, which is a first in/first out (FIFO) memory unit.

Sequence storage manager 186 has primary responsibility for storing sequences of frames in main memory cluster 182. Sequence storage manager 186 creates a complete address for a current frame 22 and manages the actual operation of providing signals to write data into main memory cluster 182. Sequence storage manager 186 also accumulates status type information on frames 22 and sequences 54, 56, and 58. As described in greater detail below, sequence storage manager 186 uses buffer pointers, which designate a particular location in main memory cluster 182, and generate individual word addresses in that location in main memory cluster 182.

Buffer allocation unit 188 cooperates with sequence storage manager 186 to designate locations within main memory cluster 182 for buffering received data, such as asynchronous frames to be delivered to the current node 12. Buffer allocation 188 requests a buffer point and holds a current value of the buffer pointer that sequence storage manager is using. Buffer allocation 188 is described in greater detail below in conjunction with the FIGS. 8 and 9.

Buffer return 190 performs buffer and buffer chain deallocation. List transfer unit 192 cooperates with link list 180, buffer allocation unit 188, and sequence storage manager 186 to track buffer ownership. Link list 180 is a pool of buffer pointers and their associations used for associating groups of buffer pointers together in lists. A buffer pointer indicates a location in main memory cluster 72 with which the buffer pointer is associated. Each list represents a sequence of frames. Each pointer in the list points to a specific location in main memory duster 182 that turn actually holds the data. By utilizing link list 180 data within main memory cluster 182 can be manipulated or simply by manipulating the buffer pointers within link list 180. Isochronous service pointer queue 196 includes a pair of two-deep isochronous transmit queues for each isochronous frame type. Management of main memory cluster is described in greater detail below in conjunction with FIGS. 8 and 9.

Main memory cluster 182 includes a quad memory interleave 198 and four memory units 200, 202, 204, and 206 interconnected to quad memory interleave 198. Quad memory interleave 198 receives control signals on a line 208 from memory control unit 122 of scheduler 76. Main memory microprocessor interface 184 provides an interface between main memory 72 and microprocessor 26 associated with the node 12 in which main memory 72 resides for the purpose of reading and writing frame contents by microprocessor 76 while simultaneously reading and writing frames to and from the network.

According to the present invention, data in both asynchronous and isochronous frames 22 are stored in main memory cluster 182. Asynchronous frames must be stored until retransmitted within a sample window or, in case time is not available within a given sample window for transmission, the frame must be stored for retransmission in a later window. Isochronous frames are stored because they are re-circulated to permit data to pass through master node 16. Because both asynchronous and isochronous frames need to be stored, it is cost effective to use the same memory system for both types of frames. However, the storage of both asynchronous and isochronous frames in the same memory systems leads to problems because requirements and conditions for frame routing and re-transmission are very dissimilar. In one embodiment, isochronous sequences can be assumed to be composed of consecutive frames. This does not hold true for asynchronous sequences, which can be interrupted by the isochronous services, for instance. Therefore, main memory cluster 182 is managed as described below in conjunction with FIGS. 8 and 9.

Figure 8:
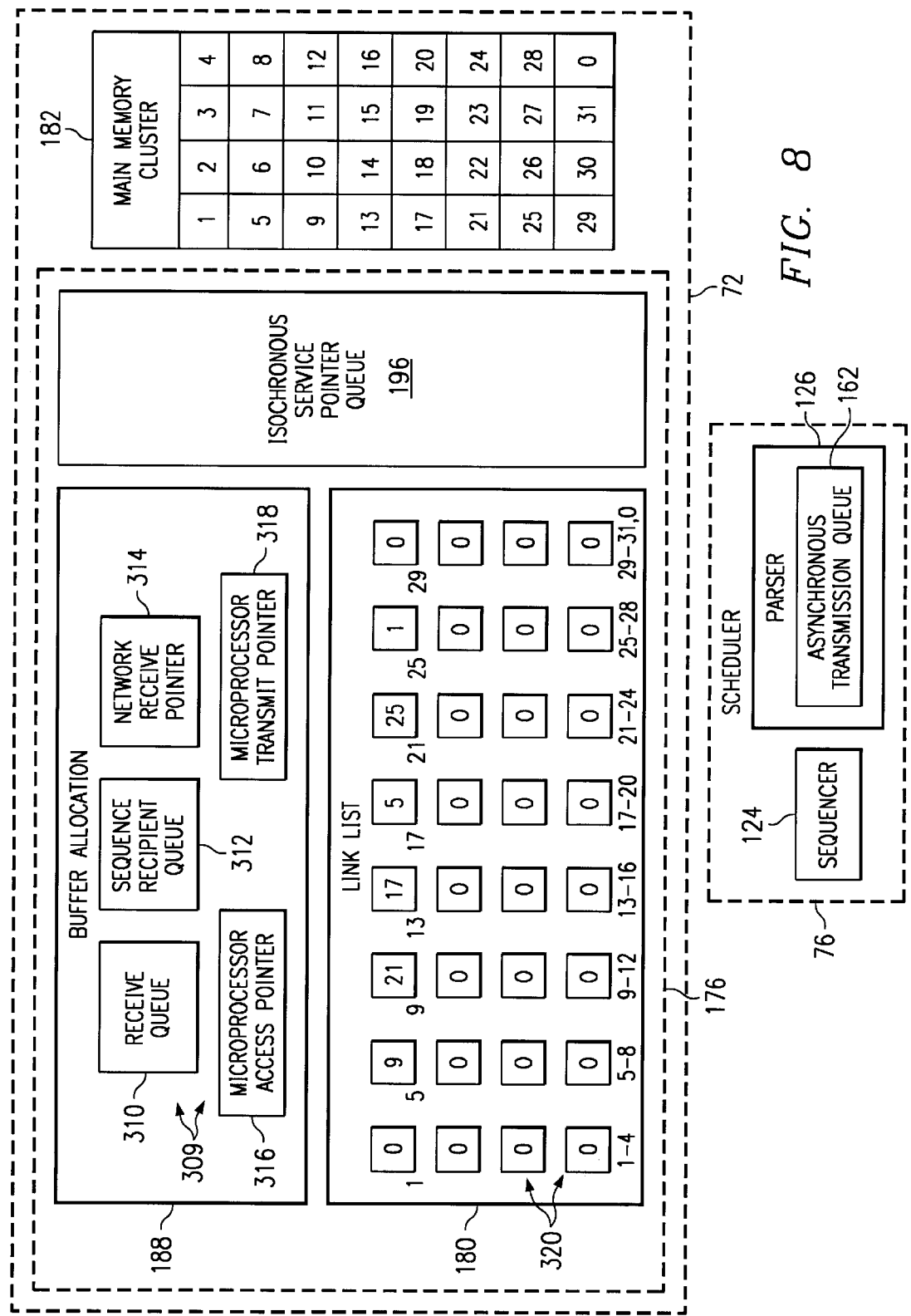
FIG. 8 is a block diagram of selected portions of the network interface unit illustrated in FIG. 4 that are related to memory management of the network interface unit.

FIG. 8 is a block diagram of selected portions of network interface unit 28 illustrated in FIG. 4 that are related to memory management of network interface unit 28. For clarity of illustration, selected elements of network interface unit 28 that are particular relevance to the management of the storage of frames 22 in main memory cluster 182 are illustrated in FIG. 8 in relation to the larger functional components in which they reside. Additional elements within these larger functional elements that are described elsewhere herein but are not helpful to the description of the management of main memory cluster 182 are not illustrated in FIG. 8.

Buffer allocation 188, described above, includes a plurality of queues or registers 309 for storing buffer pointers indicating a location of memory within main memory cluster 182. Plurality of queues or registers 309 include receive queue 310, a sequence recipient queue 312, a network receive pointer register 314, a microprocessor access pointer register 316, and a microprocessor transmit pointer register 318. Each of these queues or registers 309 is temporarily assigned ownership while storing data in main memory cluster 182, of a buffer pointer associated with that data. These buffer pointers are accessed by sequence storage manager 186 for actual manipulation of memory within main memory cluster 182.

According to one embodiment of the invention, link list 180, illustrated in greater detail in FIG. 8, includes thirty-one buffer pointers, in addition to a "null" buffer pointer. Each of these thirty-one buffer pointers is illustrated in FIG. 8 as having an index of a number between one and thirty-one. These buffer pointers point to respective locations in main memory cluster 182, also illustrated in FIG. 8. Main memory cluster 182 is organized into thirty-two separate memory locations. Each of these locations is associated with a buffer pointer points to the beginning of one of the thirty-two memory locations within main memory cluster 182. For example, buffer pointer "1" is associated with and points to a location in main memory cluster indexed by the number "1." In addition to storing these thirty-one buffer pointers, link list 180 maintains associations between related pointers. This is effected through storing in a register the value of a buffer pointer that immediately follows a previous buffer pointer.

For example, in the illustrated embodiment, buffer pointer "5" stores the value "9," buffer pointer "9" stores the value "21," buffer pointer "13" stores the value "17," buffer pointer "17" stores the value "5," buffer pointer "21" stores the value "25," buffer pointer "25" stores the value "1," and buffer pointer "1" stores the value "0."This sequence of values indicates a sequence of buffer pointers of "113", "17", "5", "9", "21", "25", "1", and "0". This sequence of buffer pointers corresponds to a sequence of memory locations in main memory cluster designated by corresponding numerals. These portions of main memory cluster 182 store a sequence of frames in the designated order. Thus a sequence of frames 22 may be stored in non-consecutive locations of memory by maintaining the link list 180. Instead of transferring buffer pointers associated with each individual frame in a sequence, only the buffer pointer associated with the first frame and the buffer pointer associated with the last frame are manipulated within the various queues. However, frames that do not exist in sequences do not utilize this feature. For example, the remaining buffer pointers in link list 180 store a value of "0", indicating they are not linked to any other pointer. This indicates that the frames stored in the corresponding memory location in main memory cluster 72 is not associated in a sequence with any other frames 22.

Isochronous service pointer queue 196 includes, as described above, two sets of buffers that correspond to each of the different frame types. In one embodiment in which sixteen different frame types are supplied, isochronous service pointer queue 196 includes sixteen pairs of the buffers. Isochronous service pointer queue is used for storage of buffer pointers for tracking isochronous sequences held in main memory cluster 182 awaiting retransmission for each of the plurality of frame types. A pair of buffers is utilized for each frame type so that, while one buffer is being written to, the corresponding buffer in the pair may be read from.

Associated with the management of main memory cluster 182 are previously described elements within scheduler 76. These elements include sequencer 124 and asynchronous transmission queue 162, which is located within parser 126.

These elements are provided buffer pointers at an appropriate time for accessing main memory cluster 182.

Because isochronous frames 22 are generally transmitted in sequences and asynchronous frames 22 are generally transmitted individually, storage of each type of the frame 22 in main memory cluster 182 is dependent upon the type of the frame 22. If a frame 22 is part of a sequence 54, 56, 58, it is advantageous to store the locations in memory corresponding to the beginning and end of the sequence 54, 56, 58, rather than the address locations within main memory cluster 82 for each individual frame. However, if the frame 22 is not part of a sequence 54, 56, 58, the address of in main memory cluster 182 of the individual frame is stored. Therefore, manipulation of buffer pointers within link list 180 is formed in a different fashion for frames 22 that are part of a sequence. Then is performed for frames 22 that are not part of a sequence 54, 56, 58. This manipulation of buffer pointers is described in greater detail with reference to FIG. 9.

Figure 9:
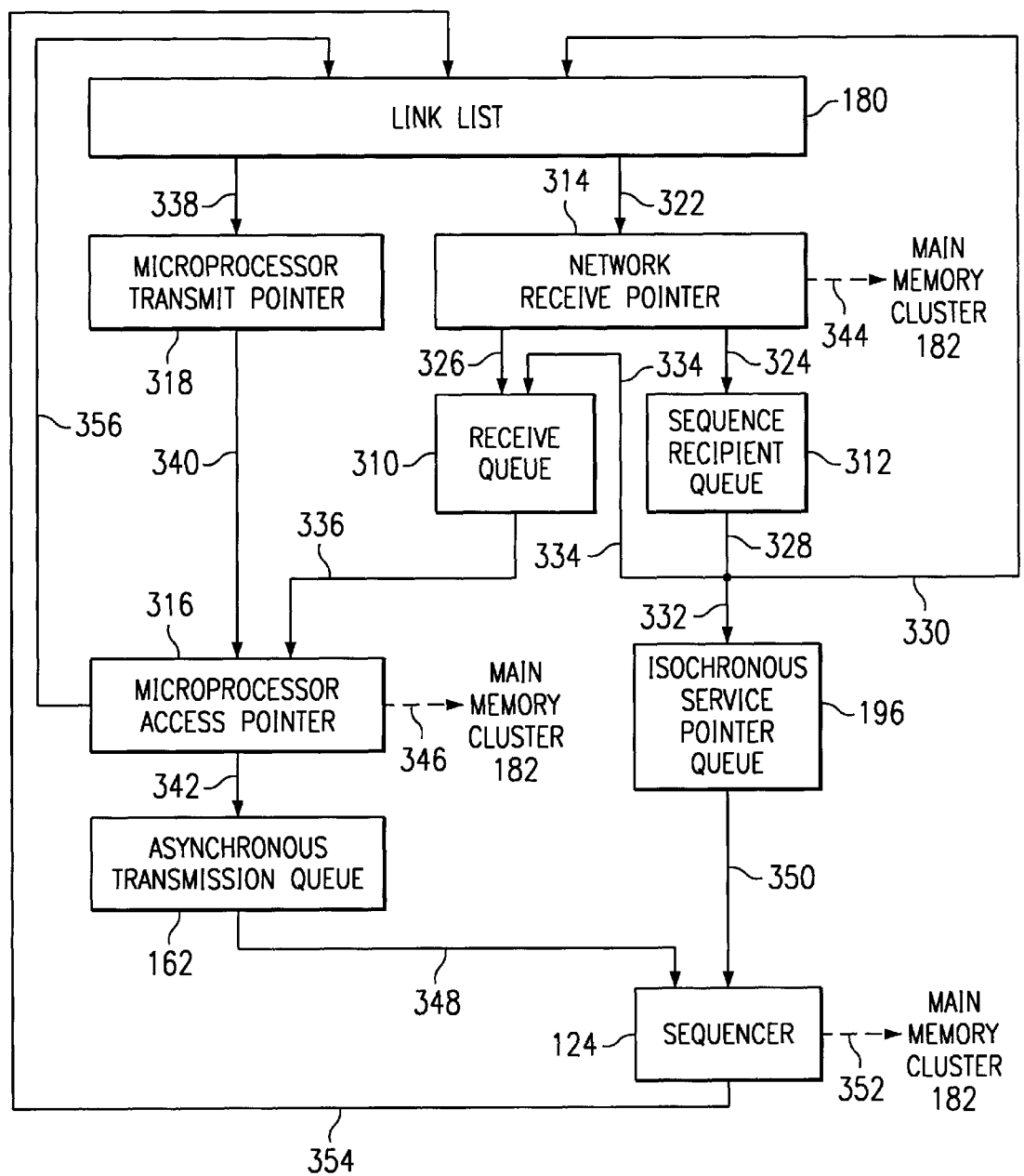
FIG. 9 is a chart illustrating progressive transferring of ownership of buffer pointers that are associated with portions of the main memory unit illustrated in FIG. 7.

FIG. 9 is a chart illustrating progressive transferring of ownership of buffer pointers that are associated with portions of main memory unit 72. Transferring of the various buffer pointers between the various queues is effected by sequence storage manager 186. At a transfer 322 of a buffer pointer, ownership of a buffer pointer is transferred from link list 180 to network receive pointer register 314. This transfer corresponds to the receiving of data by network interface unit from the network 10 over link 14. Alternatively, a buffer pointer may be transferred at transfer 338 from link list 180 to microprocessor transmit pointer register 318. This transfer corresponds to queuing data to be transmitted by microprocessor 26. A transfer 340 may then be made from microprocessor transmit pointer 318 to microprocessor access pointer register 316. Microprocessor transmit pointer 318 and microprocessor access pointer 316 work in conjunction to store a buffer pointer indicating an address in main memory cluster 182 from which data should be transmitted to microprocessor 26. Two pointer associated with microprocessor 26 are utilized so that, while data is being transmitted registers from an address indicated by microprocessor access pointer register 316, a subsequent address may be already stored in microprocessor transmit pointer 318, alleviating time delay that would be associated with waiting for microprocessor access pointer 316 to be available before storing of a second buffer pointer can begin. In this manner, microprocessor transmit pointer acts as a prefetch.

At a transfer 324, a buffer pointer or register 318 pointing to a location in main memory cluster 182 that contains a sequence of isochronous frames is transferred to sequence recipient queue 312. Operation of sequence recipient queue 312 is described in greater detail below. If a frame 22 received from network 10 is destined for microprocessor 26, the buffer pointer indicating a location in main memory cluster 182 and stored in network receive pointer 314, is transferred to receive queue 310. When microprocessor access pointer is available for reading the next frame, the next buffer pointer in receive queue 310 is transferred at transfer 336 to microprocessor access pointer 316.

Once within microprocessor access pointer 316, a frame 22 of data that is stored in main memory cluster 182 identified by the buffer pointer stored in microprocessor access pointer 316 can be read, modified, and retransmitted. If this is the case, data is read and from main memory cluster 182, modified, indicated at reference numeral 346. The buffer pointer in microprocessor access pointer register 316 is then transferred at transfer 342 to asynchronous transmission queue 162 for transmission at an appropriate time. At the appropriate time, the buffer pointer stored in asynchronous transmission queue 162 is provided to sequencer 124 for transmission. Accessing of main memory cluster 182 is designated by reference numeral 352.

Alternatively, when a buffer pointer is stored in microprocessor access pointer register 316, a new frame may be made and transmitted. Under these circumstances, the path of the associated buffer pointer is the same as if the frame of data were read, modified and retransmitted. A further alternative for manipulating data stored in main memory cluster 182 and pointed to by a buffer pointer stored in microprocessor access pointer register 316 is to read the frame of data stored in main memory cluster 182 designated by the buffer pointer stored in microsprocessor access pointer register 316 and discard the data. In this case, the buffer pointer stored in microprocessor access pointer 316 is transferred at transfer 356 back to link list 180 register.

In the above description, or asynchronous frame 22 received from network 10 over link 14 is not part of a sequence and therefore utilities the route of buffer pointers previously described through receive queue 310. Alternatively, if asynchronous frames that are part of a sequence or isochronous frames, which are part of a sequence, are received from network 10 through link 14 and that have a buffer pointer stored in network receive pointer 314 indicating the location in main memory cluster 182 at which the associated frames are stored, manipulation of these sequences are effected through progression of associated buffer pointers through sequence recipient queue 312. Through use of sequence recipient queue 312, entire sequences of frames are manipulated at a given time rather than manipulating individual frames individually. At transfer 328, a sequence of frames, designated by a buffer pointer designating the first frame in the sequence of frames and a buffer pointer designating the last frame in the sequence of frames is transferred by transferring these buffer pointers to isochronous service pointer queue 196. The purpose of isochronous service pointer queue 196 is to store buffer pointers for tracking isochronous sequences held in main memory cluster 182 awaiting retransmission for each of the plurality of frame types. Alternatively, frames stored in a sequence and pointed to by a pair of buffer pointers stored in sequence recipient queue 328 may be discarded. In such a case, the associated buffer pointers are returned to link list 180 at transfer 330. Furthermore, a sequence of frames may be transferred to receive queue 310 at transfer 334. Such a transfer would occur if the sequence of frames received consists of asynchronous frames. In such a case, receive queue 310 receives buffer pointers pointing to each individual frame in the sequence.

At an appropriate time, a buffer pointer stored in isochronous service pointer queue 196 is transferred at transfer 350 to sequencer 124. Sequencer 124 then accesses the portion of main memory cluster 182 designated by the buffer pointer or buffer pointers received by sequencer 124. After such accessing, sequencer 124 returns the buffer pointer or buffer pointers over transfer 354 back to link list 180.

Thus, the above described procedure allows manipulation of data within main memory cluster 182 by merely manipulating buffer pointers rather than the actual data. Furthermore, both asynchronous and isochronous frames, which may or may not be grouped into sequences, may be manipulated through the use of a separate sequence recipient queue 312 and a receive queue 310. An additional advantage of the present implementation of the present invention includes the recirculating nature of buffer pointers. Buffer pointers are never discarded, but are rather recirculated back to link list 180 after they are used. Thus, memory allocation problems will not occur due to the loss of a buffer pointer to a particular portion of main memory cluster 182. Furthermore, locations in main memory cluster 182 are allocated for read or write access, but the pointer for those locations in memory in maintained within network interface unit 28, precluding any loss of memory due to flaws in microprocessor 26.

Figure 10:
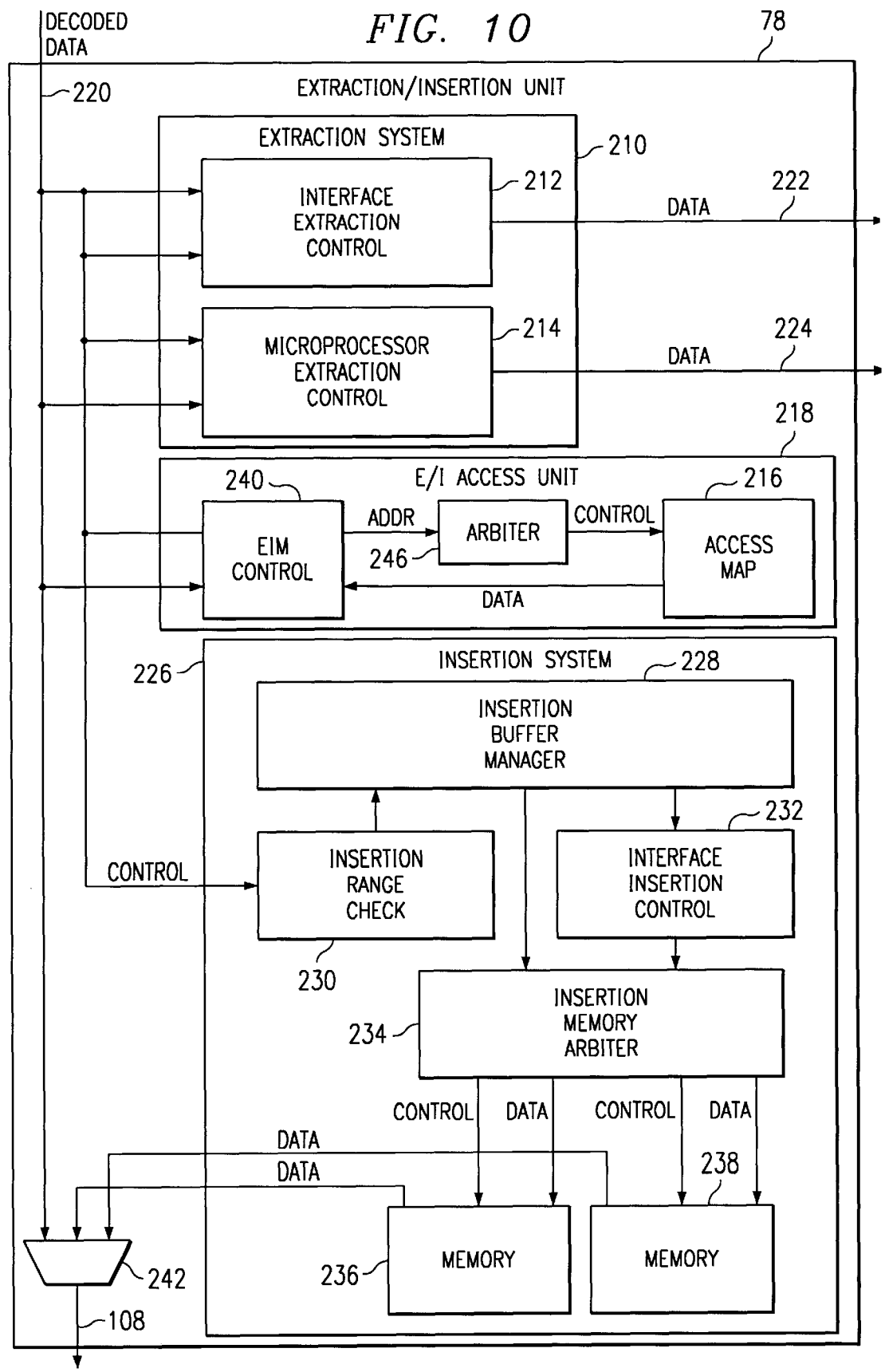
FIG. 10 is a block diagram of an extraction/insertion unit of the interface unit of FIG. 4.

FIG. 10 is a block diagram of extraction/insertion unit 78. Extraction/insertion unit 78 operates to insert data into or extract data from slots 40 of isochronous frame 22 and includes an extraction system 210, an insertion system 226, and an extraction/insertion access unit 218.

Extraction system 210 extracts information from slots 40. This extracted data is subsequently transmitted to one of two destinations. First, data stored in slot 40 may be intended for the terminal 18 associated with the node 12 in which extraction/insertion unit 78 resides. Alternatively, this data may be intended for microprocessor 26 associated with node 12. In the case where the data is intended for terminal 18, the data will generally constitute information sent from one terminal 18 to another terminal 18. In the case where data is destined for microprocessor 26, such data is generally associated with control functions of network 10. This data may be transmitted by a slave node or by master node 16. To extract these two types of information, extraction system 210 includes an interface extraction control 212 and a microprocessor extraction control 214. The operation of extraction system 210 is described in greater detail below.

Insertion system 226 includes an insertion buffer manager 228, an insertion range check 230, an interface insertion control 232, an insertion memory arbiter 234, a first memory unit 236, and a second memory unit 238. Insertion buffer manager 228 manages writing of data to and from insertion memory 236 and 238.

Insertion buffer manager 228 obtains destination information from extraction/insertion manager control 240 regarding where data is to be inserted. Insertion range check 230 checks the range of slots into which data is to be inserted to confirm that node 12 has write access to this range. Interface insertion control 232 provides additional control over insertion memory 236 and 238. Insertion memory arbiter 234 arbitrates access to insertion system memory 236 and 238 by insertion buffer manager 228 and interface insertion control 232. Insertion system memory 236 is used to store data so that it may be quickly transferred to frame 22 as the frame travels through network interface unit 28. Memory unit 238 performs the same function as memory unit 236. A multiplexer 242 selects data received from either memory unit 236, memory unit 238 or a data path 220 and provides the selected data as output signal on a line 108.

Extraction/insertion access unit 218 designates a slot 40 of a given node 12 for reading information from or insert information into. Extraction/insertion access unit 218 includes an extraction/insertion manager control unit 240, an arbiter 246, and access map 216. Access map 216 is described in greater detail below in conjunction with FIG. 11 and provides an indication of slots in a given node for reading information from and slots in a given node for inserting information into. Extraction/insertion map control 240 controls writing to access map 216. Arbiter 246 controls access to access map 216.

Insertion system 226 inserts data into slot 40 through the use of access map 216. Inserted data originates either from microprocessor 26 or from terminal 18 and is stored in insertion buffer memory 236 and 238. Insertion buffer memory 236 and 238 provides adequate buffering such that each message type may have two concurrent messages stored at a given time. Insertion system 228 inserts data into slots 40 through the use of access map 216. Access map 216 is described in greater detail below in conjunction with FIG. 11. The operation of insertion system 226 is also described in greater detail below.

FIG. 10 is an illustration of access map 216. Access map 216 provides an indication of slots 40 available to be written to or read from by node 12. According to one embodiment, access map 216 has address locations 0 through 639. Stored in address locations 0 through 15 is a write table 248 that stores information associated with frame types 0 through 15 for transmission through the network interface unit 28, and therefore indicates slots 40 available for writing to for each frame type. Located at address locations 16 through 31 is write table 250 for frame types 0 through 15 for transmission to microprocessor 26. Write table 250 stores information associated with frame types 0 through 15 and therefore indicates the slots 40 available for writing to for each frame type. Located at address locations 32 through 47 is an extraction table 252 for frame types 0 through 15 for transmissions both to network interface unit 28 and microprocessor 26. Extraction table 252 stores information related to an extraction access map 254. Together, extraction table 252 and extraction access map 254 indicate the slots 40 available for reading data from. Extraction access map 254 is located at memory locators 48 through 639.

Write table 248 stores at bit locations 31 through 22, for a given frame type, the number of consecutive slots 40 available for writing information. Stored at bit locations 21 through 10, for a given frame type, is the address of the first slot into which a node may insert information. Stored at slots 9 through 0 is the offset for each frame type. The offset is the base memory address offset into the insertion memory for the insertion buffers.

Write table 250 stores at bit locations 31 through 22 the number of consecutive slots 40 available for writing information for frames transmitted to microprocessor 26. Write table 250 stores at bit locations 21 through 10 the slot address for the first accessible slot 40. Write table 250 also stores an offset at bit locations 9 through 0 for a given frame type. Therefore, given the address of the first slot 40 available for writing and the number of consecutive slots 40 into which data may be written, write table 248 indicates the slots 40 for writing to for frames 22 transmitted through interface 28. The offset is a bit address offset into extraction access map 254 and is used to identify a beginning location in extraction access map 254 corresponding to a group of slots. Therefore, given the address of the first slot 40 available for writing and the number of consecutive slots for writing data, write table 250 indicates the slots for writing to for frame 22 transmitted to microprocessor 26.

Extraction table 252 stores at bit locations 9–0 an offset value that locates a start address in extraction access map 254 for each frame type. Extraction table 252 stores at bit locations 19–10 a value that locates an end address in extraction excess map 40 for each frame type. Each slot 254 for each frame type has a corresponding bit in extraction access map 254 for frames sent to network interface unit 28 and a separate bit for frames sent to microprocessor 26 that indicates whether the slot may be read from by node 12. A "one" stored in a corresponding bit location indicates that the slot may be read from and a "zero" indicates that the slot may not be read from. In this manner, non-consecutive slots may be designated as being readable by any given node 12.

In operation, extraction system 210 and insertion system 226 utilize signaling information in conjunction with extraction/insertion access unit 218 to determine whether to extract data from network 10 or whether to insert data into network 10. In one embodiment, if data is extracted a copy of data is made and if data is inserted into a slot or channel 40, data currently within slot or channel 40 is replaced with the inserted data. In one embodiment, extraction occurs prior to insertion, so that for channels that can be written to or read from by the same node 12, the data traverses the entire network after being inserted prior to being extracted.

As data "wormholes" through extraction/insertion unit 78, the decoded data path 59 is monitored to determine when frame 22 starts and ends, as well as when a sequence 54 starts and ends. Extraction/insertion unit 78 tracks frame 22 data payloads of each specific isochronous frame type to determine channel offsets. Channel offsets are used to indicate a location in memory associated with a particular slot and are listed in access map 216. Asynchronous frames 22 are passed through extraction/insertion unit 78 without modification.

In one embodiment of the invention, channels can be extracted separately for delivery to microprocessor 26 or for delivery to a terminal 18 through input/output device 24. Therefore, access map 216 includes information regarding which channels 40 are to be extracted for each of these two destinations. Extraction table 252 provides a set of configuration parameters for each of the possible isochronous types. In particular, this table contains an A_T Offset field at bits 0–9, which provides, for each type, an offset into extraction access map 254. Extraction access map 254, in turn, provides a bit map which indicates channel availability. Extraction access map 254 provides a one-to-one channel to bit mapping for each of two above-described possible destinations for constituent channels of each of the isochronous data types. Thus a bit from extraction access map 254 is allocated for each channel to interface extraction control 212 for extraction over a parallel bus (not explicitly shown) to input/output device 24 over line 222. In addition, for extraction, a bit from extraction access map is allocated for each channel to microprocessor extraction control 214, which stores the data for retrieval over line 224. This data is subsequently sent to microprocessor 26.

Channel insertion, in one embodiment of the invention, is organized in a different manner from extraction. In the case of extraction, an arbitrary set of channels 40 could be selected from each frame type for extraction. These channels 40 did not need to be consecutive or groups in any particular manner. On the insertion side, however, it is efficient to assume that all data to be inserted can be organized in a sequential block or blocks. This assumption allows the amount of memory associated with storage of insertion channel assignments to be minimized.

Extraction/insertion access unit 218 controls access to write tables 248 and 250. Thus extraction/insertion access unit 218 arbitrates read/write access from the microprocessor 26, read access from extraction system 210, and also read access from the insertion system 226.

Configuration of tables 248 and 250 is maintained dynamically by microprocessor 26. In general, all data transferred over network 10 utilizing isochronous service can be considered to be broadcast. Access to that data is accomplished at each individual node 12 by configuration of the access parameters stored in access map 216 and in that node 12. Configuring access parameters within access map 216 provides the capability to provide direct connect multicast and broadcast services with no loss in network efficiency. To create a channel connection for read purposes, or in other words, extraction, from network 10, microprocessor 26 at a node 12 is instructed by a network controller (not explicitly shown) to set an extraction access bit. Channel connection is removed by clearing the same bit in access map 216. A network controller may be a terminal connected to master node 16. Broadcast write access to the network is accomplished in an analogous manner. The network controller directs a specific node to modify the appropriate insertion (write) access table 248 or 250, depending upon whether the source of the broadcast data to be inserted is the microprocessor 26 or the local terminal device 18.

Data to be inserted into the network is held locally in memory 236 or 238 depending on the source of the data until a sequence having frames consistent with the data to be inserted is processed through the node. Module insertion range check 230 is responsible for monitoring the state of the decoded data 220 to determine reception of a sequence having frames of an appropriate type and location within the frame as the frame it travels past the extraction/insertion unit 78. At the appropriate time, existing data in frame 22 is replaced with data to be inserted. This replacement occurs at multiplexer 242. Multiplexer 242 is controlled by insertion range check 230. Insertion buffer manger 228 is responsible for monitoring which data of which type has been successfully inserted, thereby freeing up memory for additional data to be inserted.

Assuming that data is present to be inserted, each time a sequence of having frames a specific type is processed through extraction/insertion unit 78 of the node 12, a block of data from memory 236 or 238 is inserted. Once this occurs, a data buffer corresponding to that inserted data is marked as being free so that the same data is not inserted twice. If new data is not available to be inserted, null (zero) data should be otherwise inserted.

Indication of the availability of memory space to hold data for insertion is communicated to input/output unit 24 to local terminal 18. Data of the highest priority should be transferred to the interface 28 for insertion first, so long as memory is available. In one embodiment of the invention, the insertion memory 236 and 238 is configured as dual matching size buffers of variable length, where there is one pair of buffers for each isochronous type. This provides the capability to be writing new data into one buffer as data of the same isochronous type is read from another.

Extracted data sent to input/output unit 24 from the extraction/insertion unit 78 includes signaling information indicating sequence properties, such as type, corresponding to the sequence from which the data was extracted. This signaling information also indicates the first and last channel to be extracted from the sequence, as well as an indication of the integrity of the data received. Because the data cannot be validated until the last of the frame is received and cyclic redundancy check 36 verified, the extracted data is not considered complete and valid until that event occurs. This indication of frame validity is communicated to the input/output unit 24 for all extracted data. Input/output unit 24 is responsible for invalidating any extracted data that has been extracted from an errant sequence per the applicable error policy for the node. Normally data has already been extracted and may be queued for transmission to the terminal 18. If queued, then the sequence may be deleted. If transmission has already in progress, then the current frame can be invalidated and the sequence aborted, according to what error policy is in effect. Some error policies in FC-PH allow for partial sequence delivery.

Thus, extraction/insertion unit 78 allows selective access to particular frames 22 based on frame type. Therefore, data may be extracted from or written to selected portions of a frame that is transmitted isochronously between a plurality of nodes, including nodes that do not have read or write access to relevant slots 40 of frames 22. This enables isochronous transfer of information between nodes 12 in network 10 even when more than one node is originating data at the same time. This ability is particularly advantageous in applications such as video conferencing where multiple parties transmit information simultaneously and such transmission requires synchronization.

Although the present invention and its advantages have been described in detail, it should be understood that various changes, substitutions, and alterations can be made therein without departing from the spirit and scope of the present invention as defined by the appended claims.

What is claimed is:

1. A method for communicating information in a network having a plurality of nodes, comprising:
   designating one of the plurality of nodes as a master node;
   scheduling, by the master node, transmission of one of a plurality of types of frames in a sample window bandwidth, the frame having a plurality of slots;
   receiving, at a first node of the plurality of nodes, a transmitted frame;
   determining from the type of frame the slots of the frame available for access at the first node;
   accessing by the first node, a slot of the frame determined to be accessible at the first node;
   transmitting the frame to a second node of the plurality of nodes according to a schedule determined by the master node; and
   scheduling, by the master node, based on available space in a sample window bandwidth, aperiodic transmission of an additional frame.

2. The method of claim 1 and further comprising transmitting the additional frame to one of the plurality of nodes.

3. A method for communicating information in a network having a plurality of nodes, comprising:
   providing a frame from a plurality of frame types for storing information, the frame comprising a plurality of slots;
   for each of the plurality of nodes, designating based on frame type the slots for extraction of information by the node and designating slots for insertion of information by the node;
   scheduling in a sample window bandwidth transmission of the frame to one of the plurality of nodes at a designated time;
   transmitting the frame at the designated time to one of the plurality of nodes; and
   after arrival of the frame at one of the plurality of nodes, initiating insertion of information into a slot designated by frame type for insertion of information or extraction of information from a slot designated by frame type for extraction of information.

4. The method of claim 3, wherein designating slots for insertion of information comprises producing a table indicating, for each slot, whether the node has been identified to insert information into the slot.

5. The method of claim 3, wherein designating slots for extraction of information comprises producing a table indicating, for each slot, whether the node has been identified to extract information from the slot.

6. The method of claim 3, wherein initiating insertion or extraction of information comprises initiating insertion of information to a slot designated as a slot for insertion of information and further comprising:
   writing the information to a buffer before initiating insertion of information into the designated slot; and
   inserting the information into the designated slot from the buffer.

7. The method of claim 3, wherein initiating insertion or extraction of information comprises extracting information from a slot designated as a slot for extraction of information and further comprising transmitting the extracted information to a data port.

8. The method of claim 3, wherein providing a frame having a plurality of slots comprises providing a frame capable of storing thirty-two bits of data.

9. The method of claim 3, and further comprising retransmitting the frame at a periodic rate.

10. A network for information communication having a plurality of nodes serially connected in a loop topology for transmission of frames of data, each node having an interface unit comprising:
    an input/output port receiving a plurality of types of isochronous frames of data transmitted to the nodes of the serially connected loop, the input/output port decoding the received data for processing, said input/output port also transmitting the plurality of types of frames of data to other nodes on the serially connected loop;
    a scheduler receiving a frame of decoded data from the input/output port to establish timing of transmission or retransmission of the plurality of types of frames of data in a sample window bandwidth to establish periodic communication between the plurality of nodes;
    an extraction/insertion unit receiving a frame of data from the scheduler for further processing the frame of data in accordance with a designated frame type from the plurality of frame types; and
    a selector receiving data from the extraction/insertion unit for transmitting to the input/output port for encoding and transmission of the frame of data to the plurality of nodes.

11. The network for information communication as in claim 10 further comprising a memory for receiving a copy of the frame of data from the input/output port for availability to the scheduler as required for retransmission.

12. The network for information communication as in claim 10 further comprising a multiplexer receiving the decoded data for determining the processing path for the data for transmission to either the scheduler or the extraction/insertion unit.

13. The network for information communication as in Claim 11 wherein frames of data comprise asynchronous frames in addition to isochronous frames, the interface unit further comprising:
    a routing control unit receiving the decoded information from the input/output port for processing isochronous frames to said memory for further processing by said scheduler or for transmission to the extraction/insertion unit.

14. The network for information communication as in claim 13 wherein the scheduler processes asynchronous frames of data on a bandwidth available basis.

15. The network for information communications as in claim 13 wherein said scheduler includes a schedule for timing the transmission and retransmission of isochronous frames of data to the extraction/insertion unit.

16. The network for information communication as in claim 15 wherein said scheduler creates the schedule based on a scheduling algorithm in conjunction with a schedule table.

17. The network for information communication as in claim 10 wherein the extraction/insertion unit reads data from or inserts data into slots of isochronous frames of data according to the type of frame.

18. The network for information communication as in claim 17 wherein the extraction/insertion unit includes an access table defining nodes designated for reading or inserting data into designated slots of a frame of data.

19. A network for information communication comprising a plurality of nodes serially connected in a loop topology for transmission of isochronous and asynchronous frames of data, each node having an interface unit comprising:

one or more input/output ports receiving frames of data transmitted to the nodes of the serially connected loop, an input/output port decoding the received data for processing, said input/output port also transmitting frames of data to other nodes of the serially connected loop;

a main path and an auxiliary path, the main path providing both isochronous and asynchronous processing of data, the auxiliary path providing asynchronous and loop processing of data;

one or more multiplexers receiving the decoded data for selecting the main path or the auxiliary path for processing the received decoded data;

said main path comprising:
a memory for receiving a copy of the decoded frame of data routed to the main path;
an extraction/insertion unit receiving a frame of data either from one or more multiplexers or from the memory;
a scheduler generating a multiplexer select signal to direct a frame of decoded data from an input/output port to the extraction/insertion unit or to direct a frame of decoded data from the memory to the extraction/insertion unit;

said auxiliary path comprising:
auxiliary path logic receiving frames of decoded data from an input/output port for processing of frames of data for transmission to the plurality of nodes serially connected in the loop topology; and one or more selection multiplexers receiving decoded frames of data from the extraction/insertion unit or from the auxiliary path logic for transmitting to an input/output port for encoding and transmission of a frame of data to the plurality of nodes serially connected.

20. The network for information communication as in claim 19 wherein each interface unit further comprises a routing control unit receiving the decoded information from an input/output port for processing to the main path or the auxiliary path.

21. The network for information communication as in claim 20 wherein the extraction/insertion unit of each interface unit further comprises inserting data into slots of an isochronous frame of data or extracting data from identified frames of data.

22. The network for information communication as in claim 19 wherein the scheduler of each interface unit further comprises a timing controller for timing of transmission or retransmission of frames of data to establish transmission of isochronous nodes between the plurality of nodes and further controlling the transmission of asynchronous frames of data based on available bandwidth.

23. The network for information communication as in claim 20 wherein the routing control unit of each interface unit processes decoded information from an input/output port to the extraction/insertion unit or for storage in the memory.

24. A method for communicating information in a network having a plurality of nodes serially connected in a loop topology, comprising:

designating for each of a plurality of frame types for each of the plurality of nodes slots of a frame for extraction of information and slots of the designated frame for insertion of information;

scheduling in a sample window bandwidth for each of the plurality of frame types transmission of a frame to the plurality of nodes at a designated transmission time;

transmitting the frame at the designated time to the plurality of nodes serially connected; and initiating insertion of information into a slot at a designated node and/or extraction of information from a slot at a designated node after arrival of the frame at one of the plurality of nodes.

25. The method for communicating information as in claim 24 further comprising:

designating slots of a frame for a designated node for insertion of information and/or extraction of information.

26. A method for communicating information in a network having a plurality of nodes serially connected in a loop topology, comprising:

designating for each of a plurality of frame types a node for extraction of information from slots of a frame for storing information and for insertion of information into the slots of a frame, wherein designating a node for insertion of information into a slot comprises generating a table indicating, for each frame, whether the node has been identified to insert or extract information into a slot of the frame;

scheduling during a sample window bandwidth transmission of the frame to the plurality of nodes at a scheduled transmission time;

transmitting the frame at the scheduled time to the plurality of nodes serially connected; and initiating insertion of information into a slot at a designated node and/or extraction of information from a slot at a designated node.

* * * * *

UNITED STATES PATENT AND TRADEMARK OFFICE
CERTIFICATE OF CORRECTION

PATENT NO. : 6,317,415 B1
DATED : November 13, 2001
INVENTOR(S) : B. Scott Darnell et al.

It is certified that error appears in the above-identified patent and that said Letters Patent is hereby corrected as shown below:

Title page,
Item [56], U.S. PATENT DOCUMENTS,
Insert -- 5,351,243    9/1994      Kalkunte, et al.
         5,361,372    11/1994     Rege, et al.
         5,805,808    9/1998      Hasani, et al.
         6,072,832    6/2000      Katto --.

Column 1,
Line 7, delete "This application is related to an application entitled Method and System for Communication with a Network having a Ser. No. of 09/162,375 and an application entitled Method and System for Scheduling Network Communication having a serial No. of 09/162,370 and an application entitled Method and System for Managing Storage of Data having a serial No. of 09/162,372.", and insert -- This application is related to an application entitled *A Method and Apparatus for Inserting Data Into and Extracting Data From a Data Frame Having a Plurality of Slots* having Serial Number 09/162,375, now U.S. Patent No. 6,266,702 B1; an application entitled *Method and System for Scheduling Network Communication* having Serial Number 09/162,370; and an application entitled *Method and System for Managing Storage of Data* having Serial Number 09/162,372. --.

Column 2,
Line 52, after "is", insert -- a --.
Line 52, after "block", delete "a".

Column 5,
Line 17, after "implementation", delete "an", and insert -- and --.
Line 18, after "an", delete "utilities", and insert -- utilizes --.

Column 19,
Line 12, after "memory", delete "duster", and insert -- cluster --.

Column 20,
Line 34, after "of", delete "113", and insert -- 13 --.

UNITED STATES PATENT AND TRADEMARK OFFICE
CERTIFICATE OF CORRECTION

PATENT NO. : 6,317,415 B1
DATED : November 13, 2001
INVENTOR(S) : B. Scott Darnell et al.

It is certified that error appears in the above-identified patent and that said Letters Patent is hereby corrected as shown below:

Column 21,
Line 12, after "of", delete "in".
Line 33, after "to", delete "microsprocessor", and insert -- microprocessor --.
Line 35, after "and", delete "microsprocessor", and insert -- microprocessor --.
Line 38, after "to", delete "microsprocessor", and insert -- microprocessor --.
Line 39, after "with", delete "microsprocessor", and insert -- microprocessor --.
Line 42, after "in", delete "microsprocessor ", and insert -- microprocessor --.
Line 44, after "for", delete "microsprocessor", and insert -- microprocessor --.
Line 46, after "manner", delete "microsprocessor", and insert -- microprocessor --.
Line 59, after "to", delete "microsprocessor", and insert -- microprocessor --.
Line 60, after "within", delete "microsprocessor", and insert -- microprocessor --.
Line 62, after "in", delete "microsprocessor", and insert -- microprocessor --.
Line 66, after "in", delete "microsprocessor", and insert -- microprocessor --.

Column 22,
Line 12, after "in", delete "microsprocessor", and insert -- microprocessor --.
Line 15, after "in", delete "microsprocessor", and insert -- microprocessor --.
Line 17, after "in", delete "microsprocessor", and insert -- microprocessor --.
Line 19, after "description", delete "or".
Line 21, after "therefore", delete "utilities", and insert -- utilizes --.

Column 23,
Line 9, after "in", delete "microsprocessor", and insert -- microprocessor --.
Line 29, after "a", delete "microsprocessor", and insert -- microprocessor --.
Line 67, after "from", delete "microsprocessor", and insert -- microprocessor --.

Column 24,
Line 25, after "and", delete "microsprocessor", and insert -- microprocessor --.
Line 40, after "to", delete "microsprocessor", and insert -- microprocessor --.
Line 54, after "to", delete "microsprocessor", and insert -- microprocessor --.

UNITED STATES PATENT AND TRADEMARK OFFICE
CERTIFICATE OF CORRECTION

PATENT NO. : 6,317,415 B1
DATED : November 13, 2001
INVENTOR(S) : B. Scott Darnell et al.

It is certified that error appears in the above-identified patent and that said Letters Patent is hereby corrected as shown below:

Column 25,
Line 23, after "to", delete "microsprocessor", and insert -- microprocessor --.
Line 43, after "to", delete "microsprocessor", and insert -- microprocessor --.
Line 60, after "to", delete "microsprocessor", and insert -- microprocessor --.

Column 26,
Line 13, after "the", delete "microsprocessor", and insert -- microprocessor --.

Signed and Sealed this

Sixth Day of August, 2002

Attest:

Attesting Officer

JAMES E. ROGAN
Director of the United States Patent and Trademark Office